United States Patent
Melski

(10) Patent No.: US 10,061,577 B2
(45) Date of Patent: Aug. 28, 2018

(54) SYSTEM AND METHOD FOR OPTIMIZING JOB SCHEDULING WITHIN PROGRAM BUILDS

(71) Applicant: John Eric Melski, Santa Clara, CA (US)

(72) Inventor: John Eric Melski, Santa Clara, CA (US)

(73) Assignee: Electric Cloud, Inc., San Jose, CA (US)

( * ) Notice: Subject to any disclaimer, the term of this patent is extended or adjusted under 35 U.S.C. 154(b) by 379 days.

(21) Appl. No.: 14/513,446

(22) Filed: Oct. 14, 2014

(65) Prior Publication Data

US 2016/0103677 A1    Apr. 14, 2016

(51) Int. Cl.
  *G06F 8/71* (2018.01)
  *G06F 9/48* (2006.01)
  *G06F 9/50* (2006.01)
  *G06F 9/52* (2006.01)

(52) U.S. Cl.
  CPC .............. *G06F 8/71* (2013.01); *G06F 9/4881* (2013.01); *G06F 9/5038* (2013.01); *G06F 9/4806* (2013.01); *G06F 9/52* (2013.01)

(58) Field of Classification Search
  CPC .... G06F 9/4806; G06F 9/4831; G06F 9/4837; G06F 9/4843; G06F 9/4881
  See application file for complete search history.

(56) References Cited

U.S. PATENT DOCUMENTS

| | | |
|---|---|---|
| 5,325,533 A | 6/1994 | McInerney et al. |
| 5,442,791 A | 8/1995 | Wrabetz et al. |
| 5,500,881 A | 3/1996 | Levin et al. |
| 5,574,898 A | 11/1996 | Leblang et al. |
| 5,692,193 A | 11/1997 | Jagannathan et al. |
| 5,742,778 A | 4/1998 | Hao et al. |
| 6,026,413 A | 2/2000 | Challenger et al. |
| 6,094,528 A | 7/2000 | Jordan |

(Continued)

FOREIGN PATENT DOCUMENTS

EP    0859314 A    8/1998

OTHER PUBLICATIONS

Tanaka, M., et al., Pwrake: A parallel and distributed flexible workflow management tool for wide-area data intensive computing, Proceedings of the 19th ACM International Symposium on High Performance Distributed Computing, Jun. 21-25, 2010, pp. 356-359, [retrieved on Apr. 11, 2018], Retrieved from the Internet: <URL:http://ieeexplore.ieee.org/>.*

(Continued)

*Primary Examiner* — Geoffrey St Leger
(74) *Attorney, Agent, or Firm* — Womble Bond Dickinson (US) LLP

(57) ABSTRACT

A method for executing program builds comprising: analyzing file dependency information and job duration information associated with jobs of the program build; scheduling jobs for a current program build based on the analysis of the dependency information and the job duration data; executing the jobs according to the schedule; collecting file usage information and new job duration information from each of the jobs; supplementing the file dependency information with the file usage information; and storing the new job duration information to be used for scheduling jobs in subsequent program builds.

14 Claims, 21 Drawing Sheets

(56) References Cited

U.S. PATENT DOCUMENTS

| | | | |
|---|---|---|---|
| 6,237,143 B1 | 5/2001 | Fontana et al. | |
| 6,240,429 B1 | 5/2001 | Thornton et al. | |
| 6,434,590 B1* | 8/2002 | Blelloch | G06F 9/5066 |
| | | | 718/102 |
| 6,457,170 B1 | 9/2002 | Boehm et al. | |
| 6,938,252 B2 | 8/2005 | Baylor et al. | |
| 6,948,163 B2 | 9/2005 | Melahn et al. | |
| 6,988,139 B1 | 1/2006 | Jervis et al. | |
| 7,003,759 B2 | 2/2006 | Jameson | |
| 7,055,128 B2 | 5/2006 | Porkka | |
| 7,086,063 B1 | 8/2006 | Ousterhout et al. | |
| 7,100,133 B1 | 8/2006 | Meiyappan et al. | |
| 7,168,064 B2* | 1/2007 | Ousterhout | G06F 8/41 |
| | | | 714/E11.2 |
| 7,197,547 B1 | 3/2007 | Miller et al. | |
| 7,263,695 B1 | 8/2007 | Muzzafar et al. | |
| 7,346,902 B2* | 3/2008 | Dutt | G06F 8/456 |
| | | | 717/136 |
| 7,395,529 B1 | 7/2008 | Stanton et al. | |
| 7,437,705 B1 | 10/2008 | O'Bryan et al. | |
| 7,676,788 B1 | 3/2010 | Ousterhout et al. | |
| 7,840,777 B2* | 11/2010 | Mykland | G06F 9/3001 |
| | | | 712/15 |
| 8,863,128 B2* | 10/2014 | Iorio | G06F 9/5066 |
| | | | 717/124 |
| 9,286,106 B1* | 3/2016 | Huang | G06F 9/4881 |
| 9,477,523 B1* | 10/2016 | Warman | G06F 9/4887 |
| 2002/0199170 A1 | 1/2002 | Jameson | |
| 2002/0147855 A1 | 10/2002 | Lu | |
| 2003/0126118 A1 | 7/2003 | Burton et al. | |
| 2003/0126194 A1 | 7/2003 | Kase et al. | |
| 2003/0126304 A1 | 7/2003 | Wyatt | |
| 2003/0163799 A1 | 8/2003 | Vasilik et al. | |
| 2004/0073904 A1 | 4/2004 | Hill | |
| 2004/0194060 A1* | 9/2004 | Ousterhout | G06F 8/41 |
| | | | 717/120 |
| 2004/0205565 A1 | 10/2004 | Gupta | |
| 2004/0254919 A1 | 12/2004 | Guiuseppini | |
| 2005/0097441 A1 | 5/2005 | Herbach et al. | |
| 2005/0144610 A1 | 6/2005 | Zenz | |
| 2006/0004997 A1* | 1/2006 | Mykland | G06F 9/3001 |
| | | | 712/244 |
| 2006/0059253 A1 | 3/2006 | Goodman et al. | |
| 2006/0184926 A1 | 8/2006 | Or et al. | |
| 2006/0190943 A1* | 8/2006 | Haeri | G06F 9/4887 |
| | | | 718/103 |
| 2006/0195508 A1 | 8/2006 | Bernardin et al. | |
| 2008/0098369 A1 | 4/2008 | Ousterhout et al. | |
| 2008/0282246 A1* | 11/2008 | Dolev | G06F 9/4881 |
| | | | 718/102 |
| 2009/0288031 A1* | 11/2009 | Solaro | G06Q 10/06 |
| | | | 715/772 |
| 2011/0239195 A1* | 9/2011 | Lin | G06F 8/71 |
| | | | 717/126 |
| 2012/0084789 A1* | 4/2012 | Iorio | G06F 9/5066 |
| | | | 718/105 |
| 2014/0033186 A1* | 1/2014 | Bonanno | G06F 8/71 |
| | | | 717/156 |
| 2014/0282450 A1* | 9/2014 | Jubran | G06F 8/71 |
| | | | 717/151 |

OTHER PUBLICATIONS

Mizrachi, D., et al., Distributed compilation allocation with look-ahead heuristics, 23rd IEEE Convention of Electrical and Electronics Engineers in Israel, 2004, pp. 141-144, [retrieved on Apr. 11, 2018], Retrieved from the Internet: <URL:http://ieeexplore.ieee.org/>.*

Free Software Foundation, "GNU Make Manual," <http://www.gnu.org/software/make/manual/html_mono/make.html>, Jul. 8, 2002.

Knutson, J, "IBM* Technical Disclosure Bulletin," vol. 39, No. 6, Jun. 1996, pp. 63-68.

Martin Pool, "distcc User Manual," <http://web.archive.org/web/20021201095253/distcc.samba.org/manual/html/distcc-2.html>, Dec. 1, 2002.

PCT/US2004/008803, International Search Report, dated Oct. 5, 2005, 7 pages.

* cited by examiner

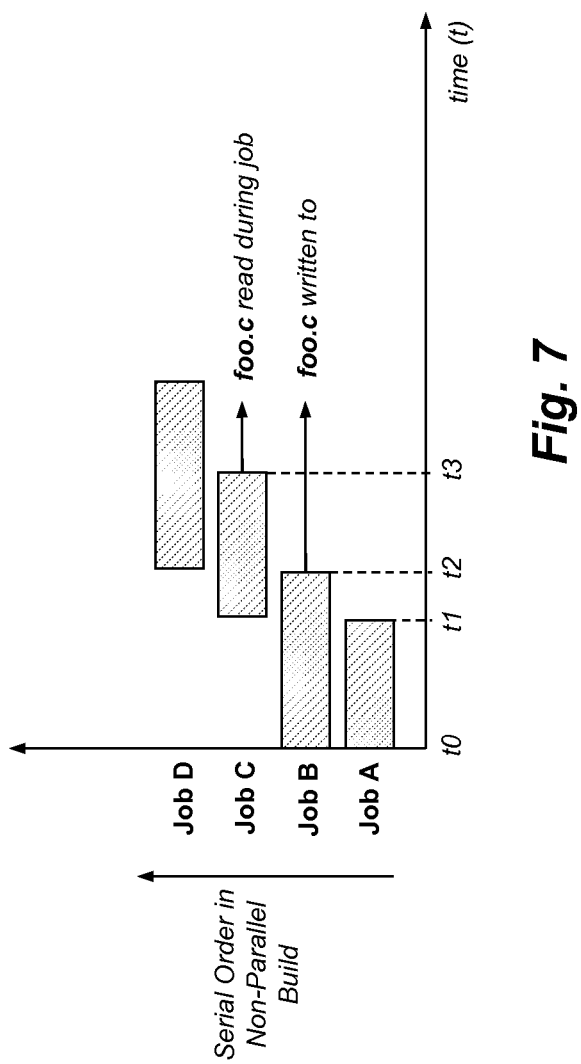

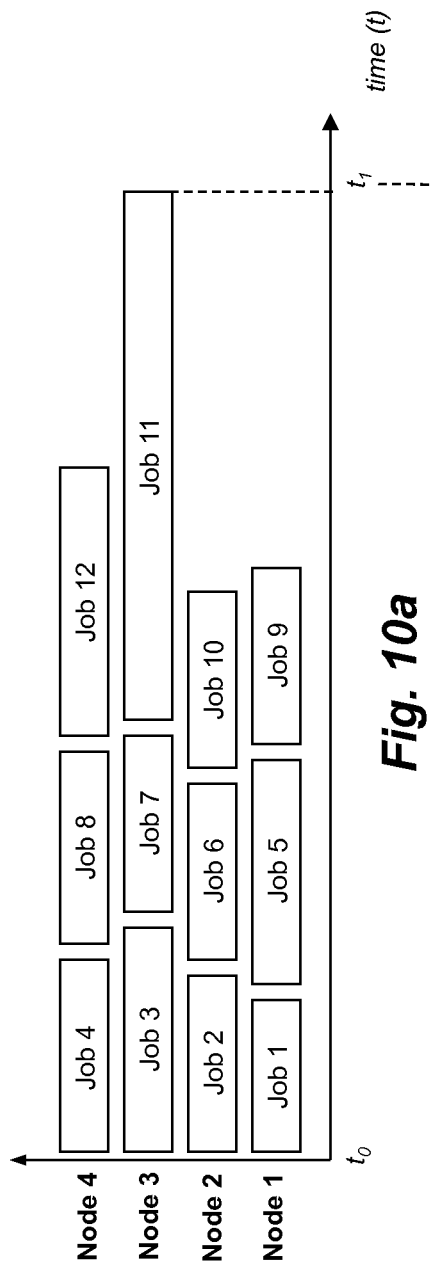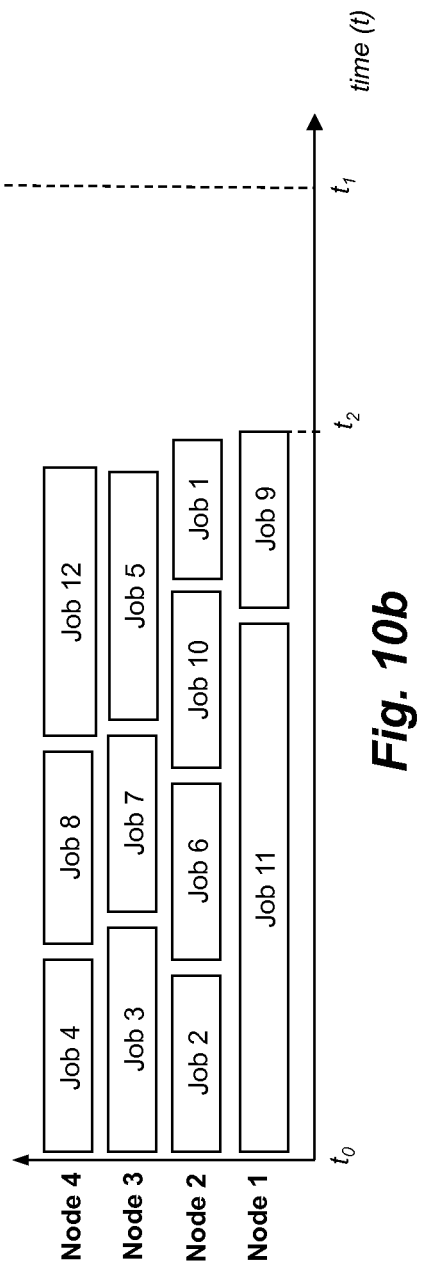
Fig. 10a
Fig. 10b

SYSTEM AND METHOD FOR OPTIMIZING JOB SCHEDULING WITHIN PROGRAM BUILDS

BACKGROUND

Field of the Invention

This invention relates generally to the field of computer aided software engineering. More particularly, the invention relates to an improved architecture for scheduling jobs in software builds.

Description of the Related Art

Computer programs are typically built from of a set of source files and "include" files, which require linking with any number of software libraries. During the program creation process, modifying any one of the source files requires recompilation of that part of the program followed by relinking. This process may be automated with software engineering tools such as the "Make" utility designed by Stuart Feldman in the mid 1970's. The Make utility works off of a file called the "Makefile" which indicates in a structured manner which source and object files depend on other files. It also defines the commands required to compile and link the files. Each file to build, or step to perform, is called a "target." Each entry in the Makefile is a rule expressing a target's dependencies and the commands needed to build or make that object. The specific structure of a rule in the Makefile is:

<target file>: list of dependencies
TAB commands to build target

A tree structure indicating dependencies for a series of exemplary source and object files is illustrated in FIG. 1. In the example, the target file a.out is dependent on foo.o and bar.o. In addition, the object file foo.o is dependent on the source file foo.cc and the header file foo.h, and the object file bar.o is dependent on source file bar.cc and foo.h (e.g., foo.cc and bar.cc may contain include statements including the file foo.h).

The Makefile used to specify the hierarchical relationship illustrated in FIG. 1 might read as follows:

a.out: foo.o bar.o
g++-Wall -g foo.o bar.o
foo.o: foo.cc foo.h
g++-Wall -g -c foo.cc
bar.o: bar.cc foo.h
g++-Wall -g -c bar.cc Thus, during the build process, if the Make utility detects that foo.h has been modified, it will reconstruct foo.o, bar.o and a.out (i.e., because they all depend, either directly or indirectly, on foo.h).

Typical software projects are far more complex than that represented in FIG. 1. Even a modest-size project can have thousands of files, resulting in an extremely complex dependency structure. In addition, Makefiles may be arranged in a hierarchical structure with higher-level Makefiles invoking lower-level Makefiles to build pieces of the project, adding additional complexity to the build process. The Makefiles are usually supplemented with scripts in a language such as Perl, which invoke Make to produce daily software builds, analyze the output of Make, run automated tests, and so on.

As mentioned above, Make operates incrementally: it only regenerates a target file if one of its dependent files has changed since the last time the target was generated. Thus, in principle it should be possible to rebuild a very large project quickly if only a few source files have changed. In practice, though, there are many times when large projects must be completely rebuilt. The most important of these times is the "nightly" build: most development projects rebuild from scratch every night (a clean build) to make sure the system is still consistent and to generate production versions for testing and release. In principle, nightly builds could be incremental, but in practice the dependency information in Makefiles isn't perfect, so the only way to guarantee consistency between the sources and the compiled version is to build from scratch. Thus, nightly builds are virtually always clean builds. Engineering builds (those for the personal use of individual developers) are often incremental, but if a widely-used header file is modified then most of the project may need to be recompiled. Furthermore, integration points (where developers update their personal workspaces with all the recent changes to the shared repository) typically result in massive recompilation.

Because of the size of modern software projects, clean builds can take a long time. Out of 30 commercial software development teams recently surveyed, only 5 had clean build times of less than two hours. More than half had build times in the 5-10 hour range, and a few reported build times of 40 hours or more. Furthermore, most organizations support multiple platforms and versions, which adds a multiplicative factor to the above times.

Long build times have a high cost for companies where software development is mission-critical. They affect not only engineering productivity and release schedules, but also software quality and overall corporate agility. When a developer makes a change to source code it typically takes at least a full day (one nightly build) before the developer can tell whether the change caused a problem.

There have been numerous attempts to improve the performance of Make over the last two decades. They fall into two general classes: "faster" approaches that execute pieces of the build in parallel, and "smarter" approaches that avoid work entirely.

The -j switch in Gmake is an example of the "faster" approach. When this switch is specified, Gmake uses the dependency information in the Makefiles to identify jobs that don't depend on each other and runs several of them concurrently. For example, "-j 4" asks Gmake to keep 4 separate jobs (pieces of the build) running at any given time. Even on a uniprocessor this provides a modest performance improvement by overlapping computation in one job with I/O in another; when run on multiprocessor machines, additional speedup can be obtained. The parallel approach offers a high potential for performance improvement because there are relatively few dependencies between files in a build. In principle, almost every source file in a project could be compiled simultaneously.

Unfortunately, the dependency information in Makefiles is rarely perfect, especially in large projects with hierarchical Makefiles. As a result, parallel builds tend to reorder the build steps in ways that break the build. For example, a library might be used to link an application before the library has been regenerated, so the resulting application does not accurately reflect the state of the library's sources. Bugs like these are very difficult to track down (the source looks good, but the application doesn't behave correctly). Some organizations have attempted to maintain enough dependency information in Makefiles to enable robust parallel builds, but most do their production builds sequentially to be safe.

In addition to out-of-order problems, multiprocessor scalability limits parallel build speed. Multiprocessor servers typically have only 2-8 CPUs, which limits the potential speedup. Larger-scale multiprocessors may have as many as 32 or 64 CPUs, but these machines are quite expensive ($30K per CPU or more, compared to $1-2K per CPU for workstations and small servers). In addition, bottlenecks within the operating system may prevent an application from taking full advantage of large-scale multiprocessors.

A variation of the parallel build approach is distributed builds, where builds are run in parallel using a cluster of independent machines instead of a multiprocessor. This approach solves the scalability and cost issues with a multiprocessor, but still suffers from out-of-order issues. In addition, distributed builds can be impacted by a variety of distributed-system issues including, for example, high overheads for invoking tasks on remote machines which can limit performance; clocks on each of the machines must be carefully synchronized or file timestamps won't be consistent and future builds may fail (a target may appear to be up-to-date even when it isn't); reliability drops as the cluster size increases due to the lack of recovery mechanisms; and cluster nodes typically use a network file system to access files, which can be considerably slower than accessing files locally on a single build machine. Furthermore, reliability issues in the network file system can affect build reliability.

The second general approach for improving build performance is to reduce the amount of work that must be done, either by doing better incremental builds or by sharing results between independent builds. One example of this approach is the "wink-in" facility in Rational Software's ClearMake™ product. In ClearMake, generated files such as object files are stored in a version control system, along with information about how they were generated. When a build requires a new version of a generated file, ClearMake checks to see if that version has already been generated by some other build; if so, the existing file is used instead of creating a new version. This approach can potentially provide significant improvements when several developers each update their private workspaces with the latest sources from the central repository, or in nightly builds where little has changed.

However, ClearMake depends on the system's ability to capture every piece of state that could possibly affect the contents of a generated file. This includes the versions of files that the target file depends on, the exact commands used to generate the target, environment variables that supply additional arguments to the command, system header files, and so on. All of these pieces of state must be considered when deciding whether a previously-generated file can be used instead of regenerating the file. Even something as subtle as the user ID or the time of day could potentially influence the value of a generated file. If a significant factor is not considered, the system will use an incorrect substitute file. In our discussions with software development organizations, we found several groups that have considered the ClearMake approach, but none that are using it for production builds.

In summary, each of the approaches described above offers the potential for speeding up builds, but each makes the build process more brittle by increasing the risk that a build will fail or that it will be inconsistent with the sources. Of the 30 commercial software development teams surveyed, none had been able to achieve more than a 5-10× speedup in a reliable enough way to use for production builds, and only a very few have achieved even a 5× speedup. Most organizations run their builds completely sequentially or with only a small speedup, in order to keep the process as reliable as possible.

BRIEF DESCRIPTION OF THE DRAWINGS

A better understanding of the present invention can be obtained from the following detailed description in conjunction with the following drawings, in which:

FIG. 7 graphically illustrates a conflict generated on a distributed build system.

FIG. 10a illustrates a plurality of independent jobs executed on four separate nodes with no consideration to job length.

FIG. 10b illustrates the same plurality of jobs executed across four different nodes taking job length into consideration.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

The assignee of the present application has developed a variety of techniques for enabling parallel execution of program builds including supplementing program builds with file usage information, detecting and correcting conflicts between jobs, caching frequently used files on the nodes which will process those files, and techniques for processing recursive program build invocations. These techniques are described, for example, in the following issued US patents (hereinafter "issued US patents"):

SYSTEM AND METHOD FOR SUPPLEMENTING PROGRAM BUILDS WITH FILE USAGE INFORMATION, U.S. Pat. No. 7,168,064;

CONFLICT DETECTION AND CORRECTION IN A PROGRAM BUILD ENVIRONMENT, U.S. Pat. No. 7,395,529;

SYSTEM AND METHOD FOR FILE CACHING IN A DISTRIBUTED PROGRAM BUILD ENVIRONMENT, U.S. Pat. No. 7,086,063;

AN ARCHITECTURE AND METHOD FOR EXECUTING PROGRAM BUILDS U.S. Pat. No. 7,676,788; and SYSTEM AND METHOD FOR PROCESSING RECURSIVE INVOCATIONS WITHIN A PROGRAM BUILD U.S. Pat. No. 7,263,695.

The embodiments of the invention described herein may be implemented within the context of a parallel program build system such as that described in the above issued US patents. A review of the parallel program system described in these issued US patents will first be provided followed by a detailed description of the embodiments of the invention for optimizing job scheduling in a program build system.

A System and Method for Supplementing Program Builds with File Usage Information Embodiments of the invention described below employ sophisticated techniques for monitoring and analysis during the program build process to enable high levels of parallelism. A network architecture for processing program builds according to one embodiment of the invention is illustrated generally in FIG. 2. The architecture is comprised of a build machine 200 from which the build process is initiated and controlled; a series of nodes 210-215 which, under the direction of the build machine 200, operate on identified portions of the build in parallel, cache source files used during the build process, and collect file usage data; and a cluster manager 202 which monitors the status of each of the nodes, and allocates nodes to build machines 200 upon request.

Figure 3A:
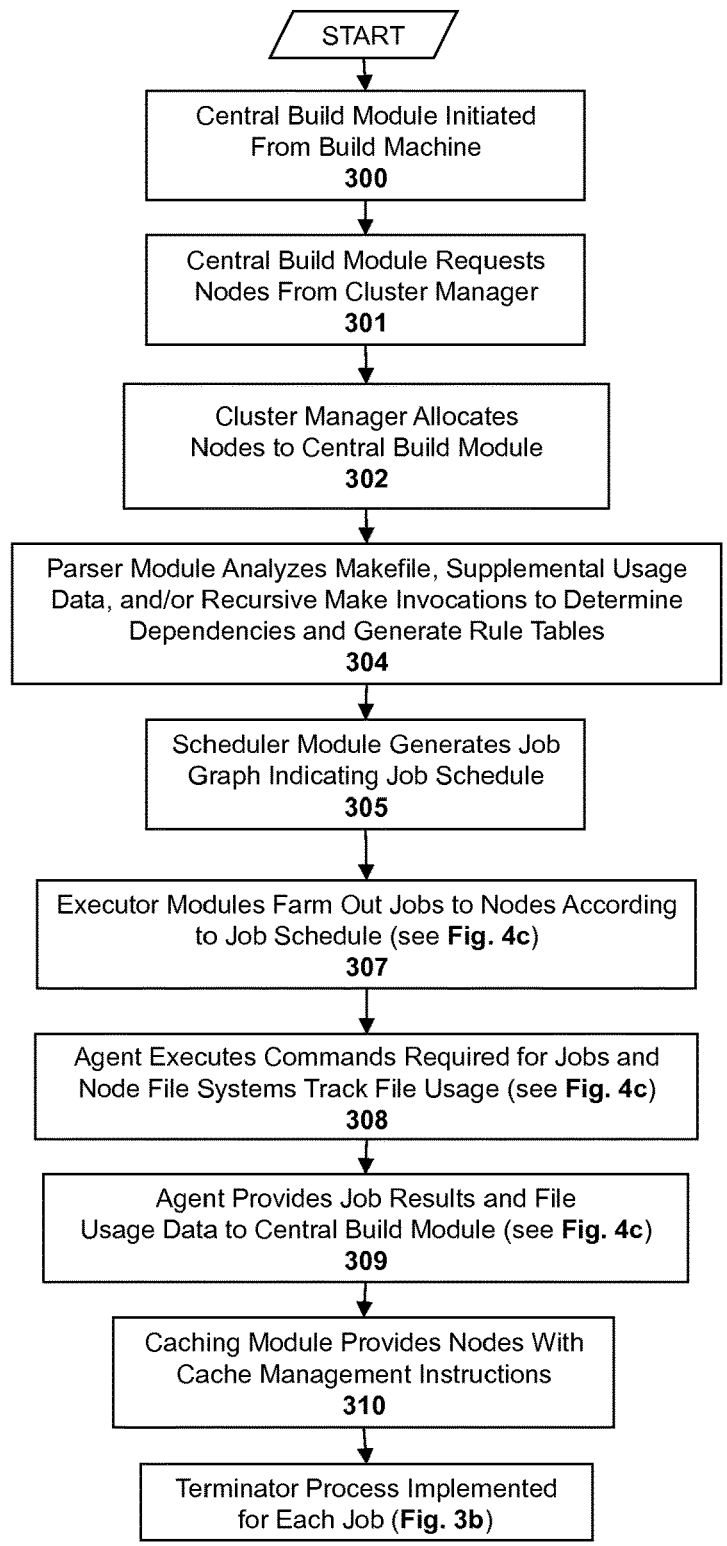
FIGS. 3a-b illustrate one embodiment of a process for performing program builds.
Figure 3B:
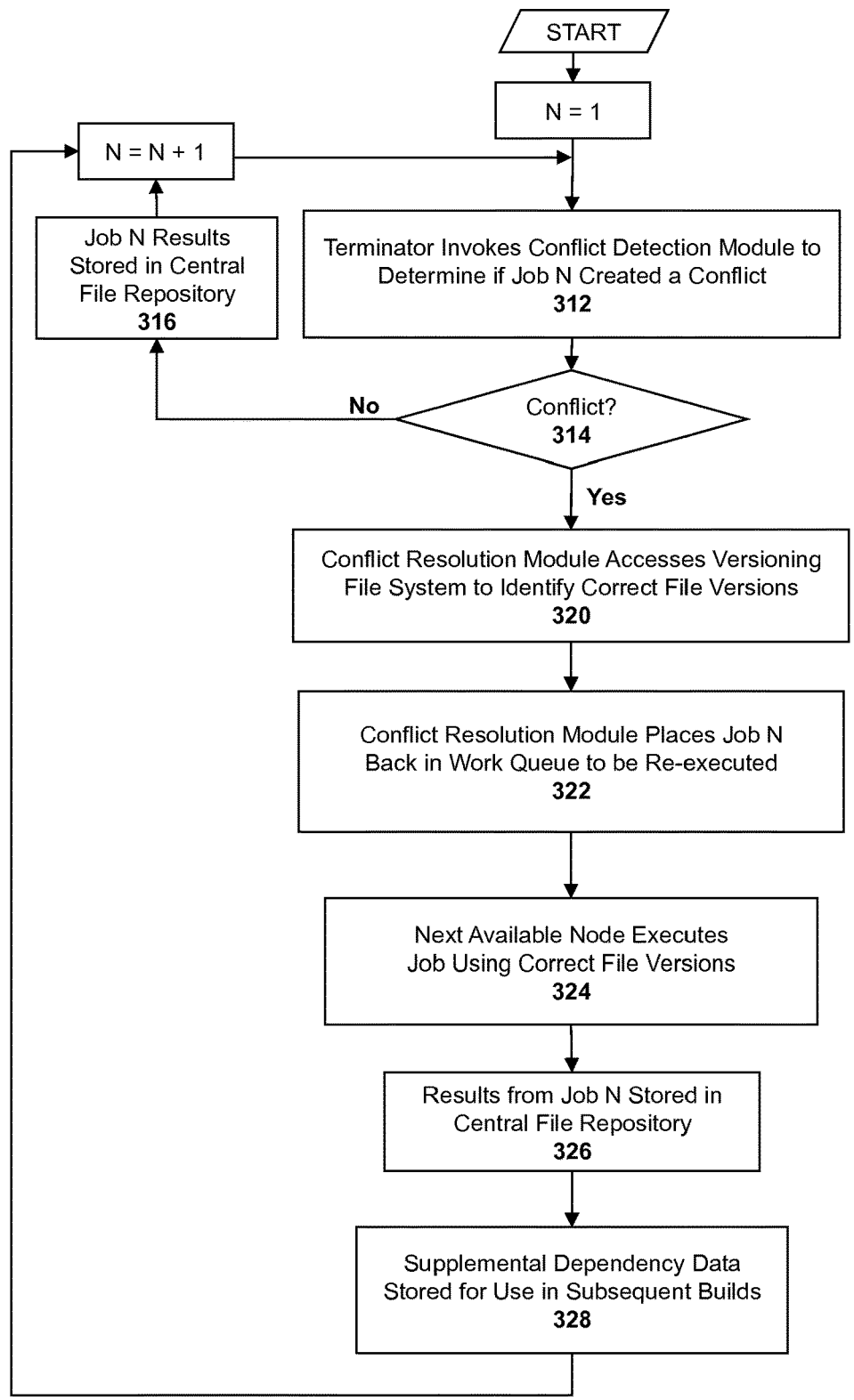
Figure 4A:
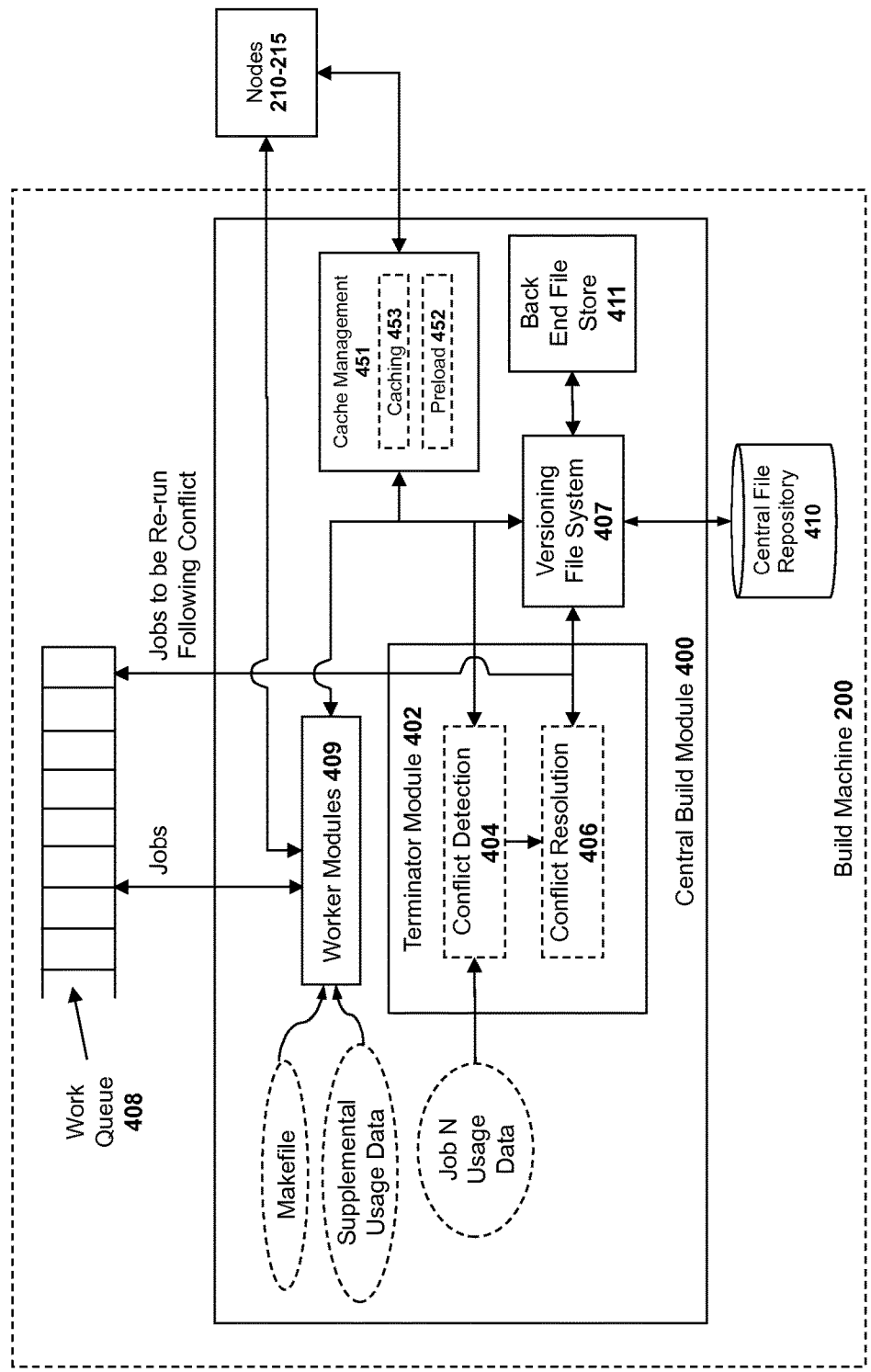
FIG. 4a illustrates a central build module according to one embodiment of the invention
Figure 4B:
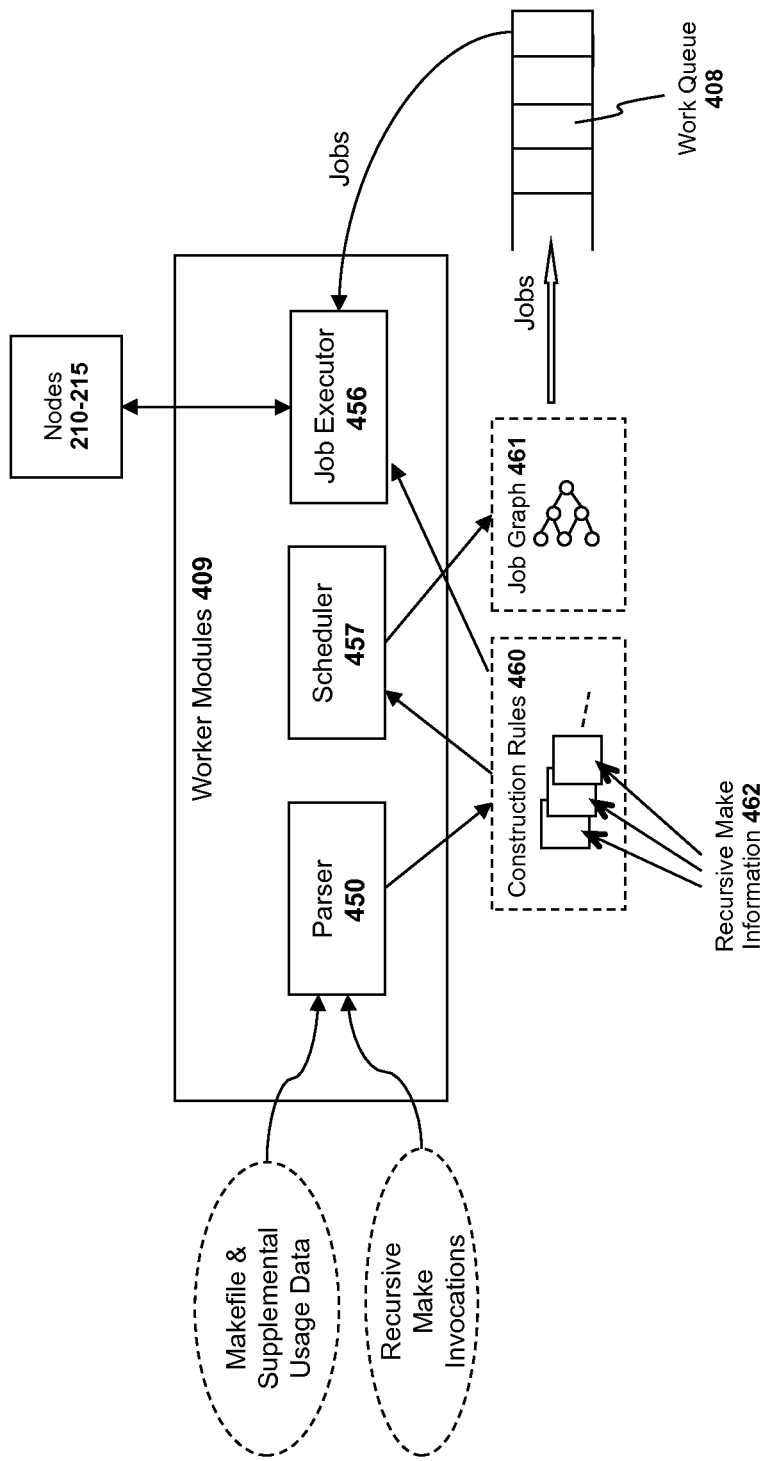
FIG. 4b illustrates different worker modules according to one embodiment of the invention.
Figure 4C:
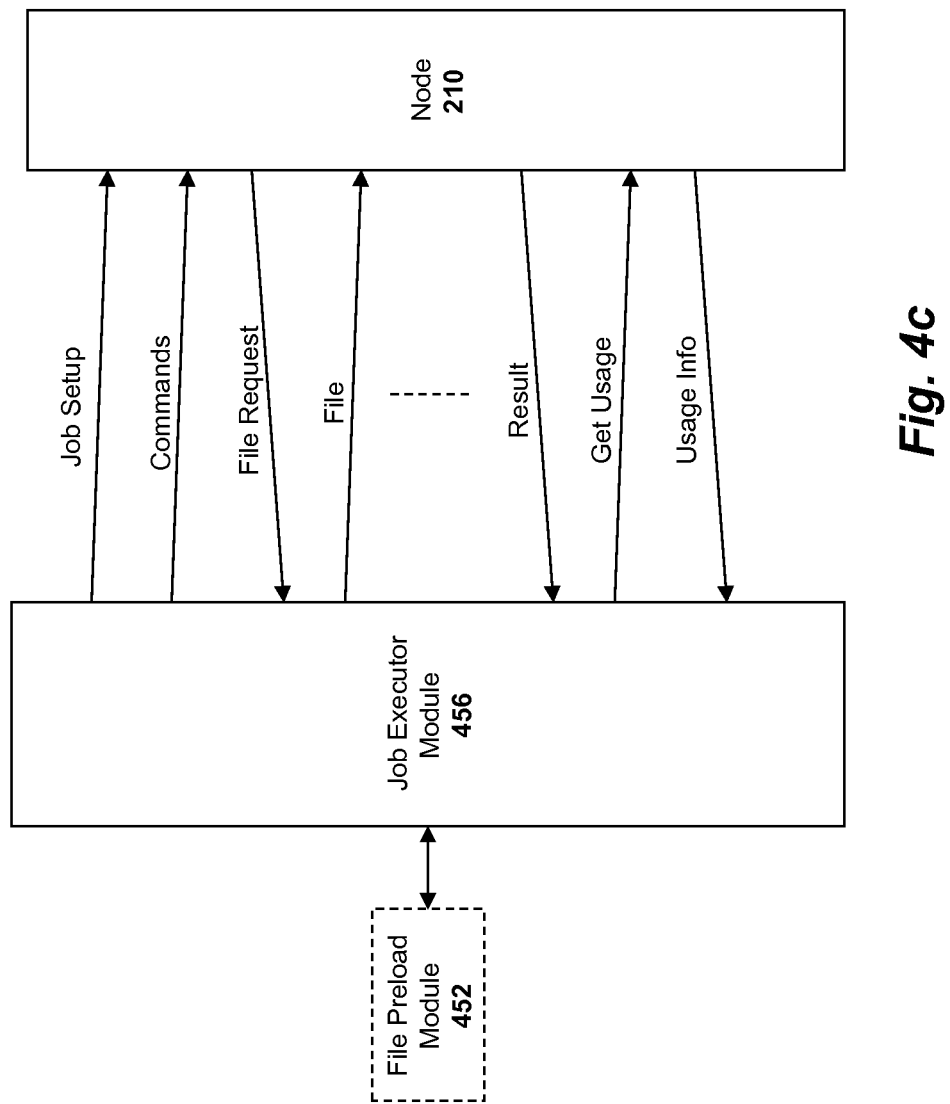
FIG. 4c illustrates a communication session between an executor module and a node according to one embodiment of the invention.
Figure 5:
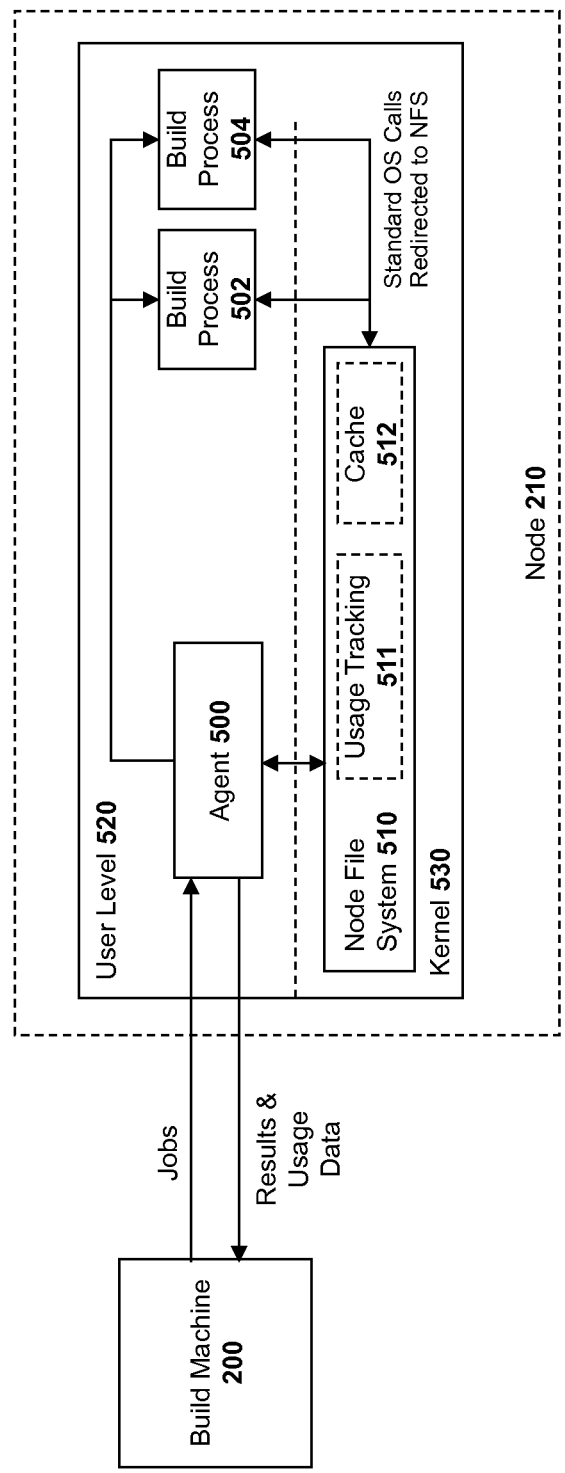
FIG. 5 illustrates a node architecture according to one embodiment of the invention.
Figure 6:
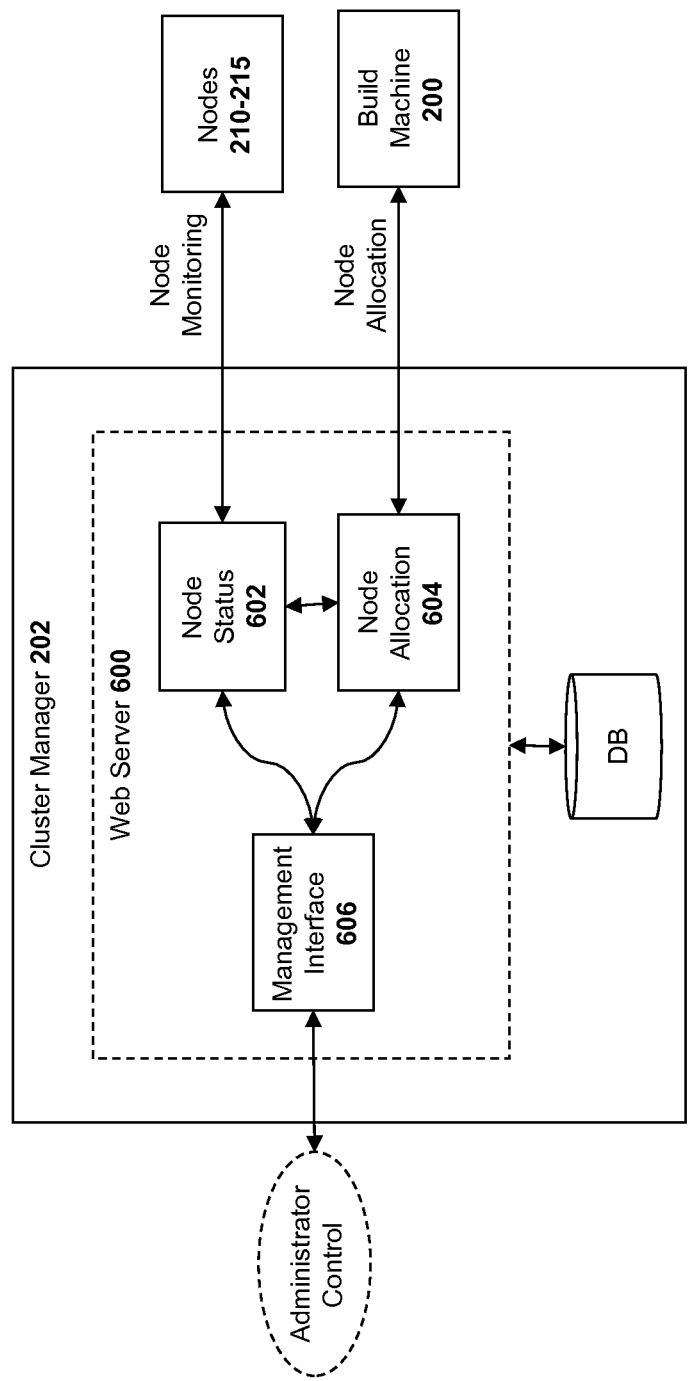
FIG. 6 illustrates a cluster manager according to one embodiment of the invention.

Details of one embodiment of the build machine 200 are illustrated in FIGS. 4a-c; details of one embodiment of a node 210 are illustrated in FIG. 5; and details of one embodiment of the cluster manager 200 are illustrated in FIG. 6. The operation of each of these system components will now be described within the context of the overall build process, illustrated generally in FIGS. 3a-b.

At step 300 of FIG. 3a, the central build module 400 shown in FIG. 4a is invoked on the build machine 200. The central build module 400 is the focal point for control and analysis during the build process. The central build module 400 collects and processes structural information about source files, file dependencies and associated regeneration rules. This information may be provided, at least in part, from Makefiles. However, while the embodiments of the invention described herein focus on "Makefiles" and the "Make" utility, the underlying principles of the invention may be employed within the context of virtually any software production environment. For example, the invention may be implemented within the context of the "Vesta" system developed by the Systems Research Center of Digital Equipment Corporation (DEC) which uses a "model file" for software builds analogous to the Makefile.

In one embodiment, the central build module 400 appears to the user to be identical to other versions of Make such as Gmake and Nmake, and/or integrated development environments such as Visual Studio™ from Microsoft. In addition, in one embodiment, the central build module 400 is capable of interpreting Makefiles in several different formats, including those supported by both Gmake and Nmake. Moreover, the central build module 400 may be invoked anywhere that other software build utilities such as Make may be invoked (e.g., engineering workstations or dedicated build machines) and may be invoked interactively or as part of a build script. As used herein, the "build machine" refers to any machine from which the build process is invoked.

The cluster manager 202 allocates nodes to build machines for individual builds. Thus, at step 301 of FIG. 3a, once the build process is initiated, the central build module 400 requests a list of nodes to be used for the current build from the cluster manager 202. As illustrated in FIG. 6, in one embodiment, the cluster manager 202 is a Web server 600 which includes a node status module 602, a node allocation module 604, and a management interface 606. It should be noted, however, that various different types of servers other than a "Web" server may be employed as the cluster manager 202 consistent with the underlying principles of the invention.

The node status module 602 continually monitors the status of each of the nodes and maintains a list of those nodes which are operating properly and those which are not. In one embodiment, the node status module 602 employs a network management protocol such as the Simple Network Management Protocol ("SNMP") (either the original SNMP standard or SNMP 2). More advanced network management tools such as Hewlett Packard® OpenView®, IBM Tivoli® or LANDesk® management from Landesk Software, Inc., may also be implemented within the cluster manager 202.

The node status module 602 may also evaluate the "health" of each node based on the node's performance during the course of one or more program builds. For example, if a particular node fails during a build on multiple occasions, the node status module 602 may designate the node as inoperative (or otherwise "unhealthy") until it is checked by a system administrator. Similarly, if a particular node is running jobs significantly more slowly than other nodes, then the node status module 602 may flag that node as requiring maintenance. Of course, the underlying principles of the invention are not limited to any particular network management protocol or policy.

In addition, in one embodiment, the cluster manager 202 includes a node management interface 606, allowing system administrators to control the node allocation policy. For example, during the day, the node allocation module 604 may be configured to allow multiple build machines to access the nodes 210-215 for individual builds. By contrast, during the "nightly build" (i.e., in which the entire project is rebuilt), the node allocation module 604 may be configured to lock out all build machines except the build machine from which the nightly build is executed.

In one embodiment, the node allocation module 604 dynamically allocates the nodes 210-215 to requesting build machines. For example, if only one build machine 200 is requesting a set of nodes at given point in time, then the node allocation module 604 may allocate all of the available nodes to the first build machine until a second build machine requests a set of nodes. When the request from the second build machine is received, the node allocation module 604 may then reallocate nodes from the first build machine to the second build machine (i.e., after waiting for the current jobs at those nodes to complete). Various different node allocation policies may be programmed within the node allocation module 604 while still complying with the underlying principles of the invention.

As used herein, the term "job" refers to any individual portion of a program build. As described in detail below, in one embodiment, jobs are executed across a plurality of nodes under the control of the build machine 200. In one particular embodiment, each job is directed to the creation of a single target file. Each job is typically comprised of a series of "operations" required to reproduce the target file (e.g., reading from a file, writing to a file, deleting a file, renaming a file, compiling a source file, linking an object file, . . . etc).

As illustrated in FIG. 4*a*, one embodiment of the central build module 400 is comprised generally of a plurality of worker modules 409 and a terminator module 402. The worker modules are responsible for analyzing the Makefile, scheduling jobs to run in parallel across the nodes 210-215, collecting the results from each job and collecting the file usage data from each job (described in detail below). The terminator module 402 is responsible for ensuring that the job results provided from each node are valid using various detection and conflict resolution techniques, some examples of which are described below.

Referring now to FIG. 4*b*, in one embodiment, three different types of worker modules 409 are employed to coordinate the build process: a parser module 450, a scheduler module 457 and a job executor module 456. As indicated at step 304 of FIG. 3*a*, the parser module 450 analyzes the Makefile, any supplemental file usage data (as described below) and/or any recursive Make instances 462 detected and processed by the system. The specific processing associated with supplemental usage data and recursive Make instances is described in detail below. Based on its analysis, the parser 450 generates a set of target construction rules 460 specifying how each individual component of the program build (e.g., each target file) is constructed. The construction rules 460 include all of the dependency information extracted from the Makefile, the supplemental usage data and the recursive Make invocations 462 as well as all of the associated ambient state information (e.g., the current working directory, any command line switches, . . . etc). In one embodiment, the construction rules 460 are stored continuously in main memory so as to be readily accessible by the scheduler 457 and job executor modules 456 during the course of the program build.

At step 305 of FIG. 3*a*, the job scheduler module 457 analyzes the construction rules 460 to generate a job graph 461 indicating the specific order in which jobs are to be executed in parallel on the nodes. By way of example and not limitation, consider the following simple Makefile:

module.a: a.o b.o
ar r module.a a.o b.o
ranlib module.a
a.o: a.cpp
g++a.cpp –c –o a.o
b.o: b.cpp
g++b.cpp –c –o b.o In this example, the targets a.o and b.o can be regenerated simultaneously, but module.a cannot be generated until both a.o and b.o are complete. The commands that regenerate the target files (i.e., ar, ranlib, and g++) execute on the allocated nodes 210-215 rather than the build machine 200. In the above example, the jobs for a.o and b.o have only a single command, while the job for module.a has two commands. In one embodiment, a node operates on only a single job at a time. However, multiple jobs may be concurrently executed on each node while still complying with the underlying principles of the invention.

Jobs which may be executed in parallel are placed together within a work queue 408 from which they are farmed out to the nodes 210-215 (until a conflict is detected, as described in detail below). Specifically, at 307 of FIG. 3*a*, in one embodiment, the job executor modules 456 read the jobs from the work queue 408 and coordinate with the nodes 210-215 to execute the jobs. In one embodiment, each executor module 456 coordinates with a single node at a time to complete a single job (although the specific node used by the executor module 456 may change from job to job). However, the underlying principles of the invention are not limited to any particular pairing of executor modules, nodes and jobs.

FIG. 4*c* illustrates the interaction between an executor module 456 and node 210 according to one embodiment of the invention. During the job setup phase, the executor module 456 initiates communication with any available node 210. During setup, the executor module 456 may provide the node with an indication of the current working directory and/or any other environment information required to process the job.

In addition, in order to accelerate the build process and to reduce data traffic between the build machine 200 and the nodes 210-215, a file preload module 452, illustrated in FIG. 4*c* and shown within a cache management module in FIG. 4*a*, is employed to preload source files to each of the nodes during the job setup phase. The preload module 452 employs a predictive caching algorithm to predict which source files will be required at each of the nodes ahead of time, using the construction rules 460, the Makefile itself, the file usage data and/or any other data which indicates the files required to complete each job. The files are retrieved from a central file repository 410 by the executor modules 456 through a versioning file system 407 which (as described in greater detail below) manages the different file versions which occur over the life of a build. The central file repository 410 on the build machine stores all of the source files required to process each job of the program build. In one embodiment of the invention, the central file repository 410 operates according to the native file system configured on the build machine (e.g., FAT 32, NTFS, . . . etc) whereas the versioning file system 407 operates at a layer above the native file system, communicating with the file system via the file system's standard interface. However, the underlying principles of the invention are not limited to any particular architecture for the central file repository 410. For example, in one embodiment, the central file repository 410 is a relational database accessible by the versioning file system via database queries.

If a particular job requires a source file which has not been preloaded to the node 210 on which the job is executing, as described above, the node 210 may request the file from the executor module 456 on the build machine 200 during the execution of the job. The executor module 456 will then retrieve the file via the versioning file system 407 and provide the file to the requesting node 210.

Returning again to the overall build process set out in FIG. 3*a*, at step 308, in response to build commands provided from the executor module 456, the agent executed on the node 210 invokes the processes required to complete the job. In the specific example shown in FIG. 5, an agent 500 invokes two build processes, process 502 and process 504, to complete the node's 210's assigned job. By way of example, the processes 502 and 504 might be ar and ranlib as described above. In one embodiment, both of the processes 502 and 504 and the agent 500 operate at the application or user level 520 whereas the node file system 510 functions within the node operating system kernel 530.

In one embodiment, the processes 502 and 504 invoked by the agent 500 access files such as source files and headers using standard function calls to the OS kernel 530. Thus, standard build applications such as gcc, ar, ranlib, and g++ may be employed on each of the nodes without modification. In one embodiment, the node file system 510 manages a specified portion of the file system (e.g., a specified directory and set of subdirectories within the file system hierarchy). The kernel 530 is aware of the portion of the file system managed by the node file system 510 and forwards any function calls directed to this portion of the file system to the node file system 510 (e.g., function calls associated with file usage). The node file system 510 then supplies the requested files to the processes 502 and 504. In one embodiment, to improve performance, the node file system 510 stores file information entirely in main memory; it doesn't use the local mass storage device for the files of the build.

When a process 502, 504 requests information not present in the node file system's 510's kernel-level cache 512 (e.g., because the file was not preloaded or cached as described above), the node file system 510 issues a request to the user-level agent 500. The agent 500 then relays the request to the central build module 400 using, in one embodiment, a simple TCP-based protocol. In one embodiment, the agent 500 maintains an open TCP socket connection with the build machine 200 throughout the course of the build. As mentioned above, the central build module 400 acts as a central file server for the nodes, reading files via the versioning file system 407 and passing the files to the nodes. The agent 500 receives the file data, forwards it into the OS kernel 530, and notifies node file system 510, which then completes the original request.

In one embodiment, to enable efficient file queries, the node file system 510 provides a virtual image of a particular directory from the build machine, plus an image of all of the files and directories that lie underneath it. The root directory of this subtree may be specified as an argument to the central build module 400 or as an environment variable. In one embodiment, the central build module 400 automatically determines the scope of the virtual directory image based on anticipated file usage. For example, the construction rules 460 contain an indication of the directories of all files required during the build process. As such, the central build module 400 analyzes the construction rules 460 to determine the lowest common ancestor of all directories referenced during the build. Based on its analysis, the central build module 400 provides a virtual image of the lowest common ancestor and all subdirectories beneath the lowest common ancestor to the node file system 510, thereby ensuring that a virtual image is provided for any directory referenced during the build.

In one embodiment, the virtual directory image is chosen to include all of the build-specific files used in the build, but not system files such as shared headers and libraries which may be replicated across the nodes statically. However, a virtual image containing shared headers and libraries may be provided as well in accordance with the underlying principles of the invention. In one embodiment, the virtual image provided by the node file system 510 lasts only for a single build; all cached information is flushed at the end of each build, and different builds may have different roots for the node file system image.

In one embodiment, the node file system 510 implements a usage tracking module 511 which collects file usage data during the course of a build and provides the file usage data to the central build module 400 for analysis, as indicated at 308 and 309, respectively, of FIG. 3a. The usage tracking module 511 records each file accessed by the processes 502 and 502 during a job. For example, if during the course of a particular job, a process creates foo.o, modifies foo.c, and reads from foo.h, the usage tracking module 511 automatically records this information until the job is complete. As described below, the usage tracking module 511 may also store the time it takes for each job to complete. Once the job completes, at step 310 in FIG. 3a, the agent 500 provides the job results (e.g., the "target" file) and the file usage information indicating how the files were used during the job to the central build module 400 (e.g., foo.c was modified, foo.h was read and foo.o was created). Alternatively, rather than waiting for the job to complete, the agent 500 may provide the file usage information as the files are accessed throughout the course of the job.

In one embodiment, the node file system 510 or the agent 500 compresses the usage data prior to transmitting it to the central build module 400. For example, if a particular file was read 10 times, then written to, and then deleted, the only relevant information with respect to the central build module 400 is that the file was read at least once and deleted. Similarly, if a particular file was written to 10 times, only the last write to the file is relevant to the central build module 400. As such, only a single "write" operation will be provided as part of the file usage data. Various additional types of file operations may be collapsed down in this manner while still complying with the underlying principles of the invention.

It should be noted that the various functional modules illustrated in FIG. 5 may be configured to operate within different system levels. For example, in one embodiment, the cache 512 and/or usage tracking module 511 are implemented at the user level 520, rather than within the OS kernel 530 as illustrated in FIG. 5. The location of these functional modules may change depending on the particular OS kernel 530 installed on the node 210.

As illustrated in FIG. 4a one embodiment of the invention includes a cache management module 451 comprising a preload module 452 and a caching module 453. As described above with respect to FIG. 4c, the preload module 452 employs a predictive caching algorithm to predict the files that will be needed at each job before the start of the job using the construction rules 460 and/or any other data which indicates the files required to complete each job. Based on these predictions, the job executor module 456 retrieves the files from the central file repository 410 via the file system 407 and transfers the files to the nodes 210-215 prior to the execution of each job.

Once the source files have been transmitted to the nodes, either through preloading or through on-demand fetches, at step 310 in FIG. 3a, the caching module 453 instructs the nodes 210-215 to cache certain source files across multiple jobs according to a specified cache management policy. As illustrated in FIG. 5, the node file system 510 includes a data cache 512 for caching the files based on instructions provided by the caching module 453.

In one embodiment, the caching policy provided by the caching module 453 indicates that certain types of source files should be cached across jobs. For example, during the build process, certain types of files such as header files (typically identified by the extension '.h') are used frequently across multiple jobs but rarely modified. Accordingly, in one embodiment, the cache management module 451 instructs the nodes to cache these files across multiple jobs. By contrast, other types of files such as object files (typically identified by the '.o' extension) are written once and not frequently used across different jobs. Thus, in one embodiment, the cache management module 451 instructs the nodes 210-215 to flush these files from cache 512 following each job.

In one embodiment, the caching module 453 analyzes the Makefile, supplemental usage data, construction rules 460 and/or the job graph 461 generated by the scheduler 457 to determine precisely which files will be needed at the nodes throughout the course of a build. Assuming that the dependency information and/or job schedule is accurate, this analysis will provide the caching module 453 with an indication of which files are used across multiple jobs and which files are not. Various additional types of data may be factored into the cache management policy implemented by the caching module 453 while still complying with the underlying principles of the invention (e.g., the supplemental usage data provided by the nodes; the size of each file with relatively large files being flushed more frequently to conserve space; whether the files are listed on a prerequisites list, . . . etc).

In one particular embodiment, files are divided into two groups: "shared" and "volatile." Each of the nodes 210 is configured to cache shared files across jobs and to flush volatile files from the cache 512 after each job. In one embodiment, all files are initially tagged as volatile. If the cache management module 451 identifies more than one reference to a file then it moves the file to the shared group. In one embodiment, if a file in the shared group is modified, the caching module 453 returns the file to the volatile group and it can never be shared again. Furthermore, if a shared file is modified then every node must flush its shared group at the end of the current job (i.e., to ensure that a cached, out-of-date version of the file is not used at a job). With this approach, shared files such as header files are cached, while source files and object files may be flushed after each job.

The foregoing two-group approach for cache management yields a simple yet effective implementation where the caching module 453 doesn't need to continually keep track of which nodes cache which files. The caching module 453 simply identifies to the agent 500 which group a file is in. Then at the end of each job, the caching module 453 identifies to the agent 500 which groups must be flushed. In one embodiment, the agent 500 segregates files in different groups to make the flushing operation operate more efficiently.

Of course, the underlying principles are not limited to a two-group caching approach. For example, as mentioned above, in one embodiment, other variables such as file size may be factored into caching decisions. For example, if a file in the "shared" group is above a certain size, then the caching module 453 may instruct the nodes to flush the file to conserve space, notwithstanding its "shared" designation. Alternatively, files above a certain threshold size may simply be marked as "volatile," and therefore automatically flushed by the nodes.

In one embodiment, the cache management module 451 does not flush a file during a job; rather, only after the job completes. Alternatively, files may be flushed during the execution of each job. This is one consequence of the technique of freezing the file system state for each job when it begins (as described below).

Following the execution of jobs, the central build module invokes a "terminator" module 402 shown in FIG. 4a which analyzes the usage information to detect and correct the out-of-order execution of jobs (hereinafter "conflicts") prior to writing the job results to the central database 410. For example, if an early job reads a particular file and a later job modifies the file, this probably indicates that the jobs were run in the wrong order, and also indicates that the Makefile is inaccurate.

FIG. 3b illustrates a process implemented by one embodiment of the terminator module 402 to evaluate and correct the results of each job (referred to generally as "Job N"). In one embodiment, the terminator module 402 evaluates the jobs in the sequential order in which the jobs complete. The terminator module 402 illustrated in FIG. 4b is comprised of a conflict detection module 404 for detecting conflicts and a conflict resolution module 406 for correcting the conflicts. At 312, the terminator 402 invokes its conflict detection module 404 to determine if "Job N" created a conflict. If not, determined at 314, then the results of Job N are committed to the central file repository at 316 and the terminator moves on to the next job in sequence. If a conflict is detected, however, then the terminator module employs its conflict resolution module 402 to resolve the conflict as set forth at steps 320-328, described below.

In one embodiment, the conflict detection module 404 uses two measures of time/order to detect conflicts. The first measure is clock time, which reflects the actual order in which events occur. Each job has a start time and a stop time, both of which are clock times. Several jobs can have the same start time, but exactly one job has a given stop time. The file versions seen by a job are determined by its start time: once a job has started, file modifications made by other jobs will not be visible to the job. Conversely, no modifications made by a job are made available to other jobs until the job completes. Moreover, in one embodiment, file updates to the central file repository 410 are atomic: either all of a job's modifications are made available to other jobs, or none of them. This approach requires the versioning file system 407 to maintain multiple versions of each file and pass different versions to different jobs. The mechanism used by the versioning file system 407 for tracking file versions is described below.

The second measure used by the conflict detection module 404 is sequential order, the order in which jobs would execute in a sequential build. The conflict detection module 404 uses the sequential order along with file versions maintained by the versioning file manager 407 to define correctness: a parallel build is correct if the file versions used by each job are the same as those that would be used if the build were executed in sequential order. If a build uses different versions than this, then a conflict has occurred.

This concept is illustrated graphically in FIG. 7 which shows four jobs A, B, C, and D executed over time (i.e., time progresses moving towards the right on the horizontal axis). For the purpose of simplicity, this example assumes that there are two nodes available to concurrently process jobs. It also assumes that, if the build were to be executed in a non-parallel manner, the sequential ordering of jobs would be A, B, C, and D. Jobs A and B both start at time t0 and execute in parallel. This indicates that, after analyzing the dependency information in the Makefile, the central build module 400 determined that Jobs A and B are mutually independent, and can therefore be executed in parallel. Job A completes at time t1, freeing one of the two nodes to process Job C (which may start shortly after t1 due to system latency). Like the decision with respect to Jobs A and B, the central build module 400 allows Jobs B and C to run in parallel because the Makefile shows Jobs B and C to be mutually independent. Job B completes at time t2, freeing up the second of the two nodes to process Job D (which, again, may start shortly after t2).

As indicated in FIG. 7, when Job B completes at time t2, the usage data provided by the node file system 510 indicates that the file foo.c was modified during Job B's execution. Moreover, when Job C completes at time t3, the usage data indicates that foo.c was read and used to generate the target file of Job C. By comparing the version of foo.c actually used by Job C (i.e., the version of foo.c available at time t1) with the most recent version of foo.c, which would have been used in a sequential build (i.e., the version of foo.c modified by Job B), the conflict detection module 404 generates a conflict. In one embodiment, the conflict detection module 404 compares the "last modified" timestamp of foo.c with the start time of Job C to detect the conflict. Rather than using timestamps, in one embodiment, an internal version number is maintained by the versioning file system 407 for each file version. Each version number associated with a file identifies the particular operation that created it which, in turn, provides an indication of when the version came into existence.

Returning to FIG. 3b, at 320, once a conflict has been detected, the conflict resolution module 406 invalidates the incorrect file versions resulting from the job that generated the conflict via the versioning file system 407, and identifies the correct file versions needed to correctly re-execute the job. Returning to the example illustrated in FIG. 7, the versioning file system 407 stores the new version of foo.c generated by Job B once Job B has completed. Thus, in response to the detected conflict associated with Job C, the conflict resolution module 406 requests the correct version of foo.c from the versioning file system 407. In one embodiment, the conflict resolution module 406 provides the versioning file system 407 with an indication of the start time of Job C (t1), which the versioning file manager 407 uses to identify the correct version (i.e., the version that Job C would have used in a non-parallel build). More specific details of query and lookup operations performed by one embodiment of the versioning file system 407 are set forth below.

Once the correct file versions have been identified, the conflict resolution module 406 must re-execute the job which resulted in the conflict. Thus, at 322 in FIG. 3b, the conflict resolution module 406 places the job at the front of the work queue 408, ahead of all other pending jobs. In one embodiment, to ensure that subsequent jobs do not generate additional conflicts resulting from the initial conflict, all other jobs are placed on hold pending the successful execution of the job which resulted in the conflict. Placing all other jobs on hold, however, may be overly pessimistic in many cases (i.e., because it will not generally be likely that subsequent jobs will depend on the invalid results of Job N). At 324 the next available node re-executes the job using the correct file versions and, at 326, the versioning file system 407 stores the results of the job in the central file repository 410 (i.e., assuming no additional conflicts exist).

In one embodiment, the versioning file system 407 stores the different file versions used throughout the build process within a back end file store 411. In one embodiment, the back end file store 411 is implemented entirely within a high speed memory (e.g., DDR SDRAM) to accelerate file access. However, depending on the size of the program build and/or the capabilities of the build machine 200, the back end file store 411 may be comprised of both a high speed memory component and a mass storage component (e.g., a hard drive). In one embodiment, files are split between the high speed memory and mass storage memory based on factors such as the probability that the different file versions will be required again during the course of the build. For example, object files (".o" files) will typically be required in a linking step at some point during the program build. As such, it may make sense to store these files within the high speed memory. By contrast, executable files, which typically represent a final result of a build operation, will not typically be required later in the build process and may therefore be stored within the mass storage memory. Various other factors may be evaluated to determine which files to store within the high speed memory and which files to store within the mass storage memory.

A conflict typically indicates that the information contained within the Makefile is incomplete or inaccurate. For example, if the Makefile used for the build illustrated in FIG. 7 contained completely accurate dependency information, the job scheduler 457 would not have scheduled Job C to run until Job B completed (i.e., an accurate Makefile would have indicated that Job C was dependent on the results of Job B). As such, at 326, following the detection of the conflict, one embodiment of the invention stores supplemental usage data which indicates the dependency. In one embodiment, the supplemental usage data is stored as a log file containing a list of all of the missed dependencies at the end of each build. The job scheduler 457 may then use both the Makefile and the supplemental usage data to create a more precise, efficient job ordering in subsequent builds (e.g., by first evaluating the dependencies within the Makefile and then evaluating the dependencies within the supplemental usage data prior to the initiation of any of the jobs). Moreover, rather than storing the supplemental usage data in a separate log file, the Makefile itself may be automatically amended to include the additional dependency information. Similarly, a supplemental Makefile, formatted as a standard Makefile rather than a generic "log" file, may be automatically generated and used along with the original Makefile in subsequent builds.

In one embodiment, the supplemental usage data stored on the build machine does not merely indicate missed dependencies which result in a conflict, as described above. The usage information also identifies redundant dependencies within the Makefile—i.e., objects listed as being dependent which are not. As such, in subsequent builds, the job scheduler 457 may use this information to run jobs in parallel which would not have been run in parallel using the Makefile alone. Conversely, the usage data may also identify data objects which are dependent but which did not result in a conflict (e.g., because the jobs were simply executed in the correct order by chance). In sum, because each file utilized during the build process is monitored by the node file system 510, the central build module 400 is provided with complete and accurate file dependency information for future builds, thereby significantly enhancing the speed and efficiency of the build process.

Moreover, in one embodiment, the supplemental usage data is not merely used to schedule jobs. Rather, the preload module 452 analyzes the supplemental usage data (in lieu of or in addition to Makefile) to precisely identify the source files needed at each node prior to start of each job. As such, groups of files may be streamed between the central build module 400 and the agents 500, thereby eliminating virtually all of the on-demand fetches that would be required otherwise. As previously mentioned, preloading files in this manner is significantly more efficient than a collection of synchronous agent requests to satisfy cache misses. This architecture not only speeds up the build process but also increases the scalability of the overall system architecture.

In one embodiment, the supplemental usage data includes the amount of time each job takes to complete in addition to the file dependency information. This information is then used by the job scheduler 457 in subsequent program builds to schedule jobs more efficiently. As described above, during the course of a program build, numerous jobs may be identified as independent of one another and may therefore be placed together in the work queue. By way of example, and not limitation, FIG. 10*a* graphically illustrates 12 independent jobs processed over time on a system having 4 nodes. Time progresses moving to the right along the horizontal axis. Because the jobs are independent of one another, they may be executed on the 4 nodes in any particular order. One of the Jobs, Job 11, takes significantly longer to process than the remaining jobs. Because the scheduler 457 scheduled Job 11 to be executed later than all other jobs in the group, the system must wait for Job 11 to complete at time $t_1$, before moving on to any subsequent jobs (e.g., because subsequent jobs are dependent on the results of Job 11).

By contrast, in the example shown in FIG. 10*b*, after the scheduler 457 analyzes the supplemental usage data which includes the amount of time it takes for each job to complete, the scheduler 457 is able to schedule the jobs to execute in the most efficient order possible. In particular, Job 11 is pushed to the front of the job queue so that Node 1 starts processing Job 11 before all other jobs in the group. As a result, each node remains busy processing jobs until about the same time, $t_2$, which may be significantly less time than the original completion time, $t_1$.

In addition, in one embodiment, the supplemental usage data identifies the processing capabilities of each of the nodes in the cluster. The scheduler module 457 may then analyze this information to pair up relatively low powered nodes with the relatively smaller jobs and relatively higher powered nodes with relatively larger jobs (e.g., such as Job 11 in FIGS. 10*a-b*). In this manner, the scheduler module can efficiently schedule jobs within an asymmetric cluster of nodes (i.e., a cluster in which the nodes have disparate processing capabilities).

In one embodiment, the processing capabilities of each node may be measured by running periodic benchmark testing. For example, every day, week, month, etc., the cluster manager 202 and/or build machine 200 may automatically invoke benchmark testing of the processing capabilities of each of the current set of nodes. Moreover, each of the nodes may be configured to conduct benchmark testing on its own and report back to the cluster manager 202 and/or build machine 200 periodically. Alternatively, in one embodiment, at the end of a build, the average time it took for each node complete each of its assigned jobs may be calculated. Assuming that the jobs were randomly distributed to each of the nodes, the average time may provide an accurate indication of the relative processing capabilities of each machine.

As described above, in one embodiment, the versioning file system 407 caches multiple versions of files during the build process so that, if a conflict is detected, if can identify the appropriate file version and re-execute the job which created the conflict. In one embodiment, to track file versions, the versioning file system 407 employs a unique file management architecture designed to keep track of two entities over time: file contents and file names. For each regular file there is a content object that describes the attributes and data for the file. The file's data may be cached in memory or stored on disk in the local file system. A name object is a reference to a content object and corresponds to a directory entry. As in operating systems such as Unix that provide hard links, multiple names may exist which refer to the same content. For each directory there is a content object that contains the directory's attributes and a hash table that maps from string file names to name objects.

Figure 8A:
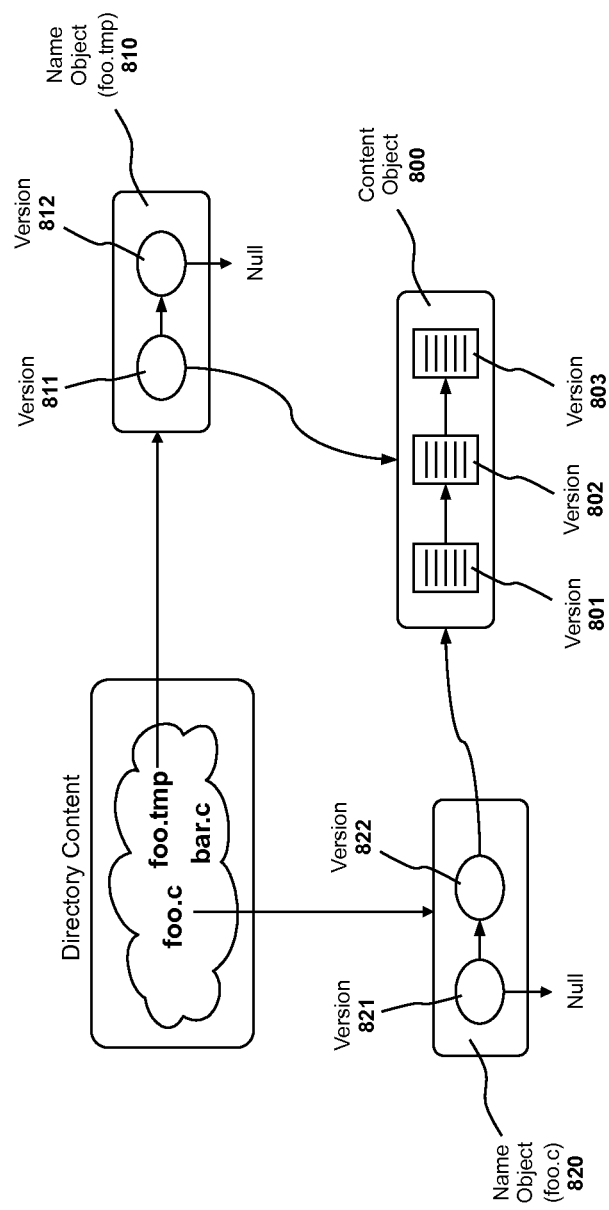
FIGS. 8a-b illustrate content objects and name objects employed by a versioning file manager according to one embodiment of the invention.

These concepts are illustrated in FIG. 8*a* which shows a directory with two name objects foo.tmp 810 and foo.c 820 which point to the same content object 800. Over the course of the build, three different versions 801-803 of the content object 800 are generated at three different points in time. Initially, the content object was identified by the temporary name object foo.tmp 810. At this time the name object foo.c pointed to a null object, as indicated by the name object version 821 (i.e., the name was not initially linked with the content object 800). During the course of the build, the name of the file was changed from foo.tmp to foo.c. As a result, a new version 822 of the name object foo.c was generated which pointed to the content object 800 and a new version 812 of the name object foo.tmp 810 was generated which pointed to a null object (i.e., the name object foo.tmp 810 was unlinked from the content object 800).

Figure 8B:
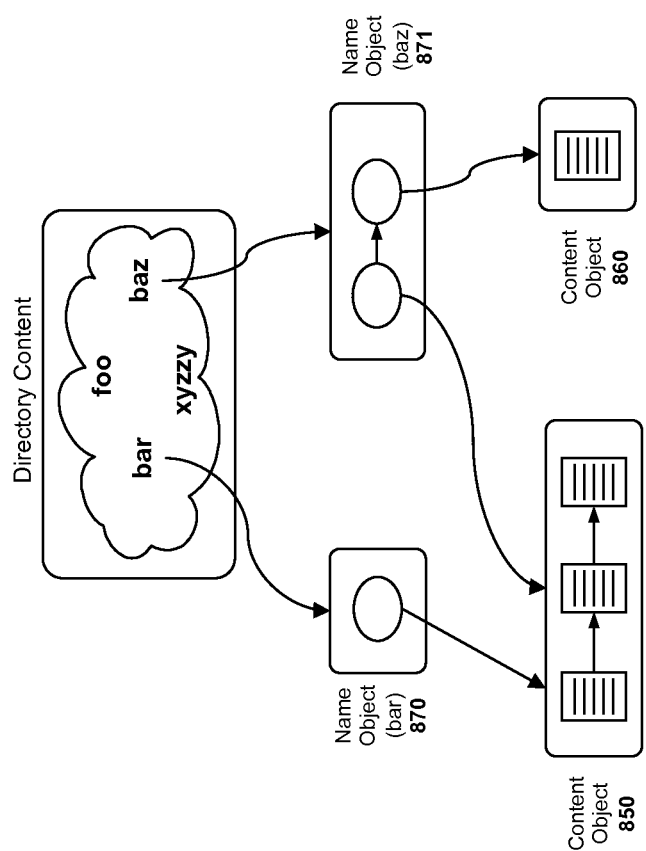

A second example is illustrated in FIG. 8*b* which shows two directory entries bar and baz associated with two name objects 870 and 871, respectively. The two name objects 870 and 871 initially pointed to the same content object 850 which, during the course of the build process, was modified twice since its original version. A later job deleted baz and re-created it with different contents. Thus, the name object baz points to a new content object 860.

As illustrated by the foregoing examples, each name object and content object contains a chain of versions. When a file is modified without first being deleted a new version is added to the content object for the file. When a file is deleted and then re-created, a new version is added to the name for the file; it refers to a new content object for the new file data. In one embodiment, each version identifies the job that created it which, in turn, provides timing information about when the version came into existence. Name version chains also include null versions corresponding to periods of time when the object didn't exist.

In one embodiment of the invention, a directory content object does not contain multiple versions for its content. Instead, it keeps multiple versions for its attributes, plus a hash table with entries for all of the names ever referenced in the directory. The name objects referenced in the hash table have their own version chains which can be analyzed to determine whether they exist at any given point in time.

In one embodiment, the nodes 210-215 are not aware of the different versions used for file names and contents. Rather, at any given time, a node is dedicated to a single job, so it only works with the appropriate file versions for that job. In one embodiment, nodes refer to file names and contents using unique identifiers that correspond to the name objects and content objects. The central build module 400 maps these to its internal data structures and then uses the appropriate version for the node's current job.

In one embodiment, to locate the correct file version, the versioning file system 407 supports two principal query operations: file lookup and data access. The file lookup operation is provided with the content object for the directory, the name of a file within that directory, and the job that requested the lookup. The versioning file system 407 must then return the appropriate content object (i.e., the data) associated with the name. To do so, it first looks up the file name in the directory's hash table and then scans the chain of versions for that name. It examines the job that created each version and ignores all versions created by jobs later in sequential order than the current job, as well as versions created by jobs that completed after the current job started. Of the name versions that remain, the latest one in sequential order is used. The file manager returns the content object referred to by that name version.

The data access operation is provided with the identified content object and the job that requested the lookup. Using this information, it scans the version list for the content object, using the same selection criteria as for names. It ignores all versions created by jobs later in sequential order and versions created by jobs that completed after the current job started. Of the content versions that remain, the latest one in sequential order is used.

In one embodiment, the conflict detection module 404 detects conflicts using the same lookup operations described above, except that it uses the current time instead of the job's start time. It then compares this version with the one actually used. In other words, it determines whether the same versions of files would be used if the job were to be executed after all previous jobs in sequential order have finished. If not, then a conflict has occurred.

Almost all software projects contain multiple modules, each with its own Makefile (or other data object containing file dependency information). The Makefiles are typically structured hierarchically, with top-level Makefiles invoking lower-level Makefiles recursively, so that the entire project can be built at once starting with the topmost Makefile. A different Makefile is often used within each subdirectory. The Makefile in a particular directory contains dependency information for the files in that directory alone. During the program build, the Make utility is recursively called to process the Makefiles in each individual subdirectory. Large projects can contain hundreds or even thousands of Makefiles.

Hierarchical Makefiles create unique challenges for parallel builds. Because an independent sequential invocation of Make is made for each Makefile it is difficult to manage concurrency and dependencies across Makefiles. That is, each invocation of Make is a separate process which does not share dependency information with other Make processes. A typical target for invoking lower-level Makes might look something like this:

all:
for dir in dir1 dir2 dir3; do cd $dir; make all; done

Unfortunately this will run the lower-level Makes sequentially, reducing the efficiency of the parallel build. The target could be redefined to expose more concurrency, as follows:

all: all-dir1 all-dir2 all-dir3
all-dir1:
cd dir1; make all
all-dir2:
cd dir2; make all
all-dir3:
cd dir3; make all However, it is difficult to share the nodes of the cluster among the lower-level Makes to optimize overall performance. In addition, most of the problems with incomplete dependency information result from interactions between Makefiles. It is difficult to detect these interactions when each Makefile is managed by a different process.

Figure 1:
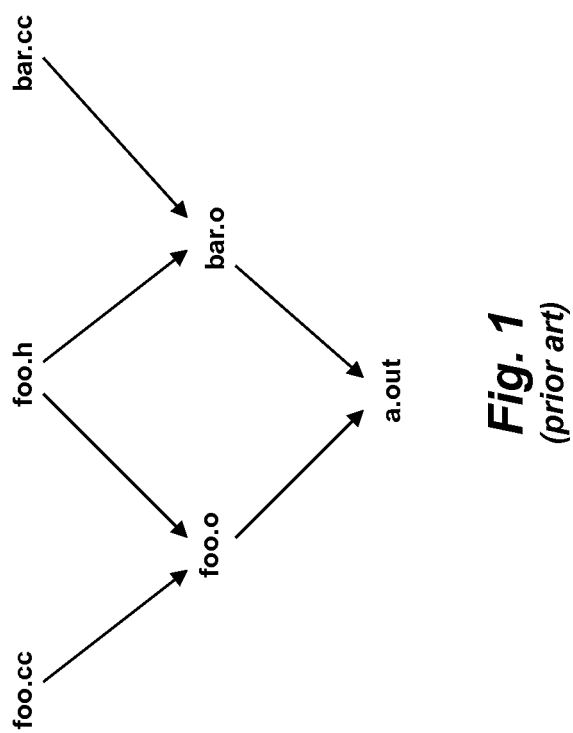
FIG. 1 illustrates an exemplary set of file dependencies analyzed during the build process.
Figure 2:
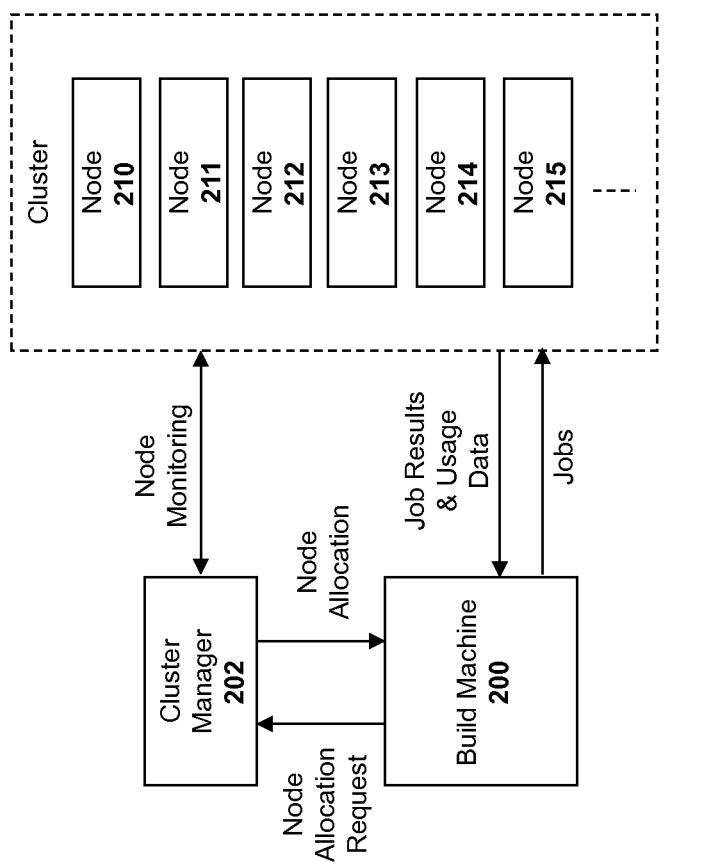
FIG. 2 illustrates an overall system architecture according to one embodiment of the invention.

For example, if this approach were employed within the distributed architecture illustrated in FIG. 2, it would run each child Make process on a separate node, which would tie up many of the nodes with Make processes. It would also make file management less efficient because the top-level Make would have to pass file data to the child Make, which would then pass it on to each of its jobs. Deeply nested Makes would cause file data to be copied again for each additional level in the hierarchy.

Figure 9:
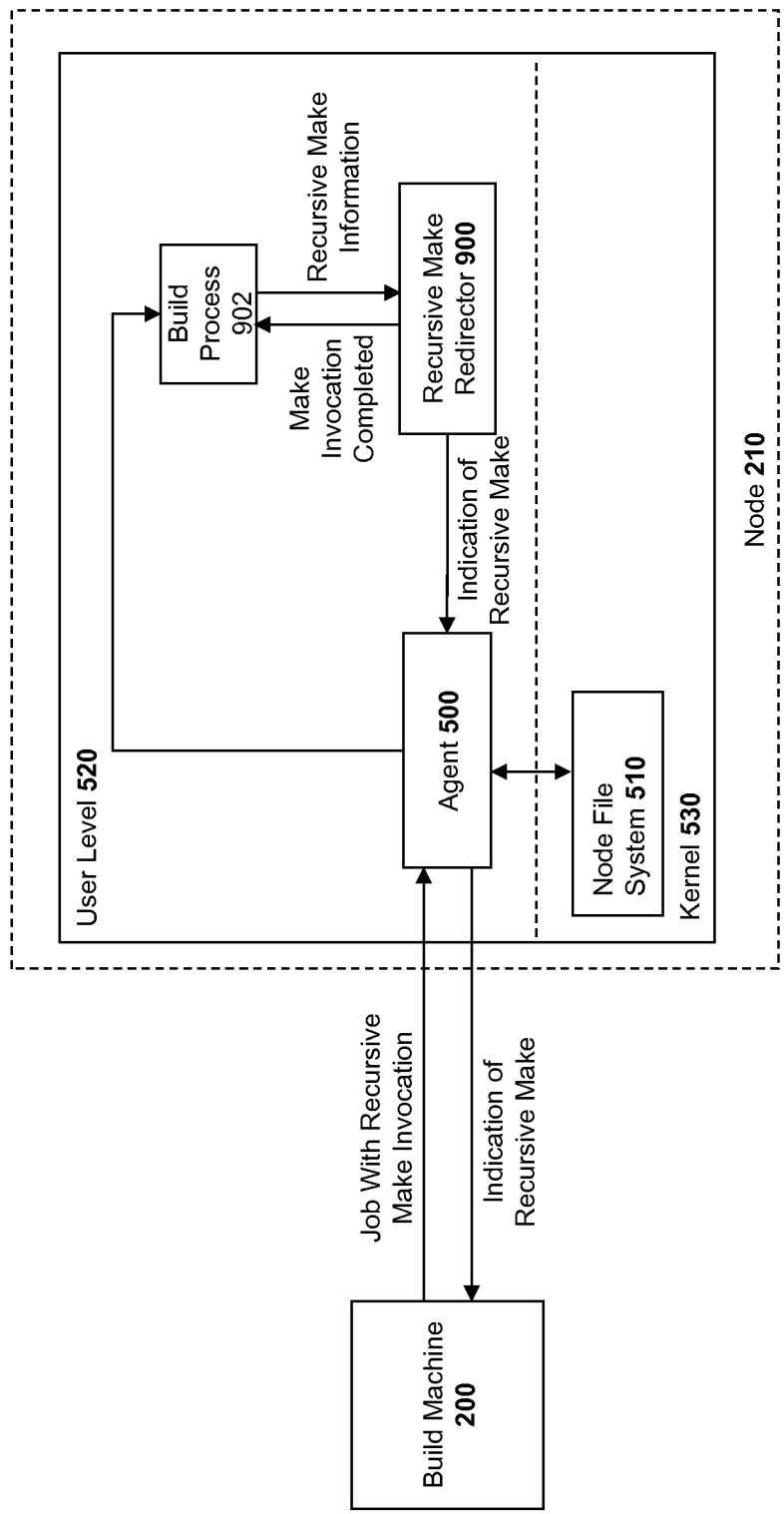
FIG. 9 illustrates a recursive Make redirector module according to one embodiment of the invention.

One embodiment of the invention solves these problems by coalescing all of the nested Makes into one large build handled by the original central build module 400. As illustrated in FIG. 9, a recursive Make redirector 900 is configured on each of the remote nodes. The recursive Make redirector 900 is a stub program which looks like the Make utility to the calling process 902. In one embodiment, when the Make redirector 900 detects that a recursive Make has been invoked (e.g., based on the change in value of a specified environment variable) it extracts the dependency information from the recursive Makefile and transmits it back to the central build module 400 via the agent 500. In addition, it instructs the process 902 that the recursive Make invocation has successfully completed. The process 902 then terminates.

In one embodiment, the recursive Make redirector 900 does not notify the agent directly that a recursive Make invocation has occurred. Rather, the recursive Make redirector 900 stores or modifies a file on the node 210 indicating that a recursive Make invocation has occurred. After the process 902 terminates, the agent 500 searches for the file and identifies the recursive Make invocation by the existence of the file (or the modification of the file). Moreover, in one embodiment, the recursive Make redirector is programmed directly within the agent 500 itself. As such, in this embodiment, "notification" of the agent 500 is not required.

As indicated in FIG. 4b, after the recursive Make information 462 is extracted and transmitted back to the central build module 400, the recursive Makefile information 462 is parsed by the parser 450 and incorporated into the set of construction rules 460. By analyzing the combined dependency information from the construction rules 460, the job scheduler 457 is able to intelligently schedule jobs to each at the nodes in the correct order, thereby consolidating the recursive Makes invocations into a single unified build process. In one embodiment, the construction rules 460 are logically divided into multiple build environments, each characterized by a different Makefile, a working directory, a set of command-line arguments, and associated environment variables.

In one embodiment, the versioning file system 407 manages all of the file versions for each of the recursive Make invocations. Moreover, the central build module 400 relies on the conflict detection and resolution techniques described above to detect and correct missed dependencies between recursive Make invocations. Because a single sequential order exists for all of the jobs in all of the Makefiles, the conflict detection module 404 is able to compare the file versions used in each job with the correct file versions (i.e., those which would have been used in a sequential build).

Another benefit of coalescing Makefiles in this manner is that it reduces file traffic between the central build module 400 and the central file repository 410. For example, if a separate instance of Make is invoked for each Makefile, each instance must read its own file information (such as timestamps) even though many of the same files are referenced across multiple Makefiles. Using the caching techniques described above, file information is cached and shared across all of the Makefiles, thereby reducing node file requests and speeding up the build process.

In some cases, a job with a recursive Make invocation may include a command following the recursive Make invocation in the job script which depends on the results of the recursive Make invocation. Because the Make invocation is not executed directly on the node, as described above with respect to FIG. 9, this may result in a conflict, because the results of the recursive Make invocation will not be available to the subsequent command. By way of example, consider the following job script which includes the recursive Make invocation $(Make) foo:

touch foo.c
$(Make) foo
cat foo

In this example, the subsequent command cat foo depends on foo which is the result of the recursive Make invocation. Because the recursive Make invocation was not actually executed on the node, the result foo will not be available and the command cat foo will create a conflict.

To solve this problem, in one embodiment of the invention, the recursive Make redirector 900 (or the agent 500) freezes the job script as soon as a recursive Make instance is encountered. The agent 500 then transmits the remaining portion of the script back to the central build module where it is scheduled as a separate job which is dependent on the recursive Make instance. For example, it may be parsed by the parser 450 and included as a construction rule 460 indicating the dependency on the recursive Make instance. Based on the new construction rule, the scheduler 457 schedules the remaining portion of the script to run only after the recursive Make instance has completed.

Alternatively, in one embodiment, the script is split into two separate jobs prior to being run on the node. For example, prior to execution, the scheduler 457 may analyze each script with a recursive Make instance to determine if any subsequent commands within the script depend on the results of the recursive Make instance. If so, then the scheduler 457 separates the script into two discrete jobs within the job graph 461, one which includes the recursive Make instance, and one which depends on the results of the recursive Make instance.

The underlying principles of the invention are not limited to any particular hardware or networking configuration for the nodes 210-215, the build machine 200 and/or the cluster manager 202. However, in one embodiment, the nodes 210-215 are a plurality of relatively inexpensive rack-mount servers such as Dell PowerEdge™ servers having 1 GHz Processors, 512 Mbytes of double data rate (DDR) random access memory and 40 Gbyte hard drives. In one embodiment, the nodes are coupled together and/or to the cluster manager 202 and build machine 200 via a fast Ethernet switch such as a Dell PowerConnect™ Ethernet switch.

Any desktop computer system communicatively coupled to the nodes 210-215, and capable of executing an instance of the central build module 400 may be used as the build machine 200. Similarly, the cluster manager 202 may be implemented using any workstation or server communicatively coupled to the network. However, for large program builds (e.g., such as the "nightly" build), the build machine is preferably a relatively high powered workstation or server. For example, in one embodiment, the build machine 200 is equipped with two or more Intel® Xeon™ processors operating at 2.80 GHz; 4 Gytes of dual channel DDR 266 MHz SDRAM memory; and a 600 or more Gbytes SCSI hard drive. Ideally, for large program builds, the build machine should be directly coupled to the same Ethernet switch as the nodes 210-215. Of course, the required hardware specifications for each of the system components will vary, depending on the size of the program builds being executed.

A System and Method for Optimizing Job Scheduling within Program Builds

One embodiment of the invention employs job scheduling optimizations to ensure that jobs are executed the most efficient order possible. In particular, in one embodiment, the length of job "chains" are evaluated to determine the order in which the chains are to be executed. As used herein, a job "chain" is a sequence of jobs such that each job in the sequence directly waits for the previous job in the sequence before it will run. This may be because of an explicit dependency (e.g., a Makefile dependency), because of a dependency that has been inferred automatically, or because of an inherent dependency for certain internal types of jobs. Among the chains starting at a given job, the "longest" is the one with the highest total run time including that starting job. In one embodiment of the invention, the job scheduling optimizations employ longest chain scheduling, which prioritizes the job having the longest chain starting at that job above jobs having relatively shorter chains.

Figure 11:
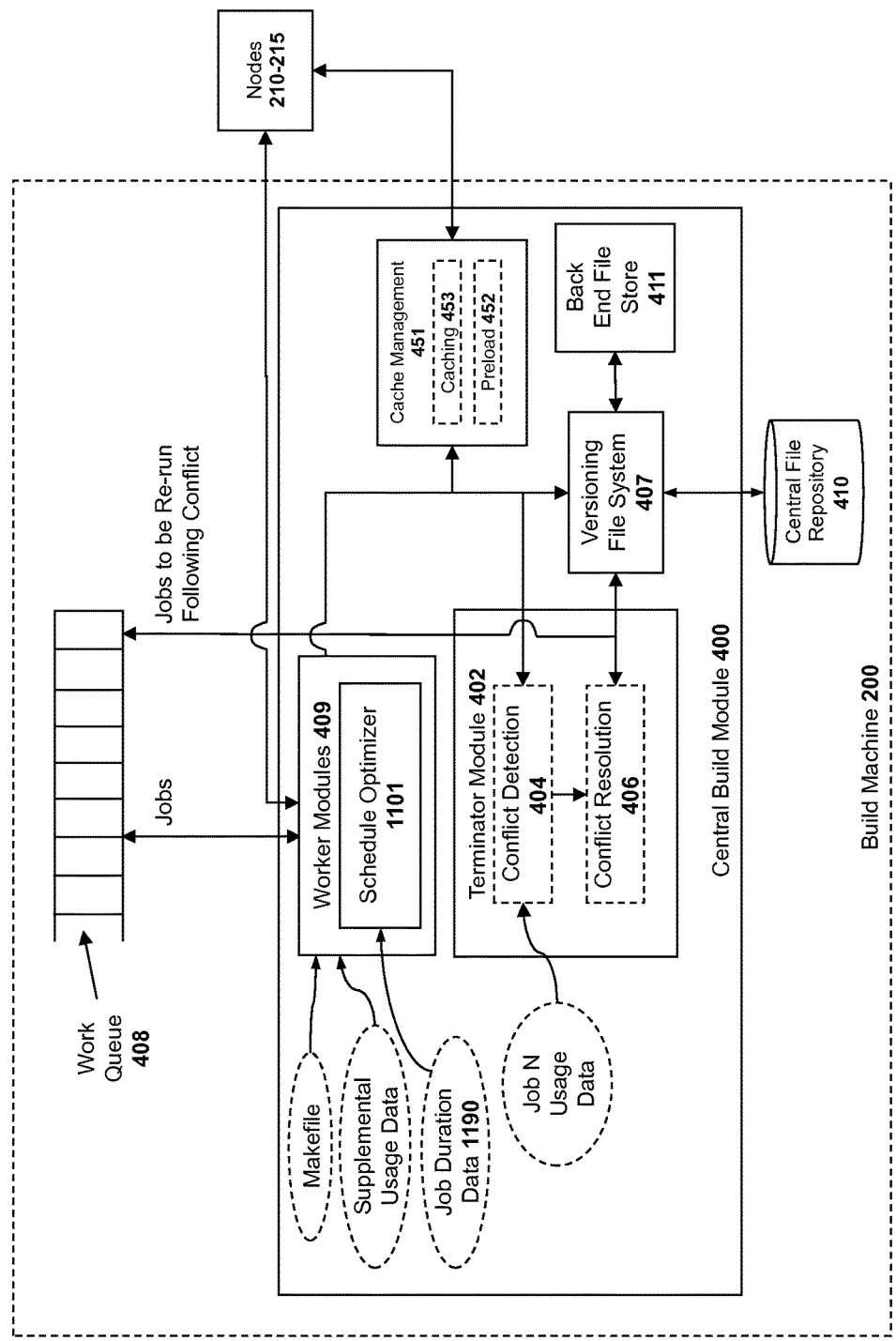
FIG. 11 illustrates one embodiment of a system for optimizing job scheduling within program builds.

As illustrated in FIG. 11, in one embodiment, a schedule optimizer module 1101 executed on the central build machine 200 performs the schedule optimization techniques described herein. In FIG. 11, the schedule optimizer 1101 is shown executed within the context of the worker module(s) 409 to optimize the scheduling of jobs to the work queue 408. In an alternate embodiment, the scheduler optimizer 408 is a separate module called by the worker modules 409 to optimize job scheduling to the work queue 408. The underlying principles of the invention are not limited to any particular architectural arrangement of the schedule optimizer 1101.

As previously described, in one embodiment, the terminator module 402 ensures that the job results provided from each node are valid using various conflict detection and conflict resolution techniques, the versioning file system 407 manages the different file versions which occur over the life of a build (stored in a central file repository 410), and the cache management module 451 controls the preloading and caching of files to the various nodes 210-215.

Figure 12:
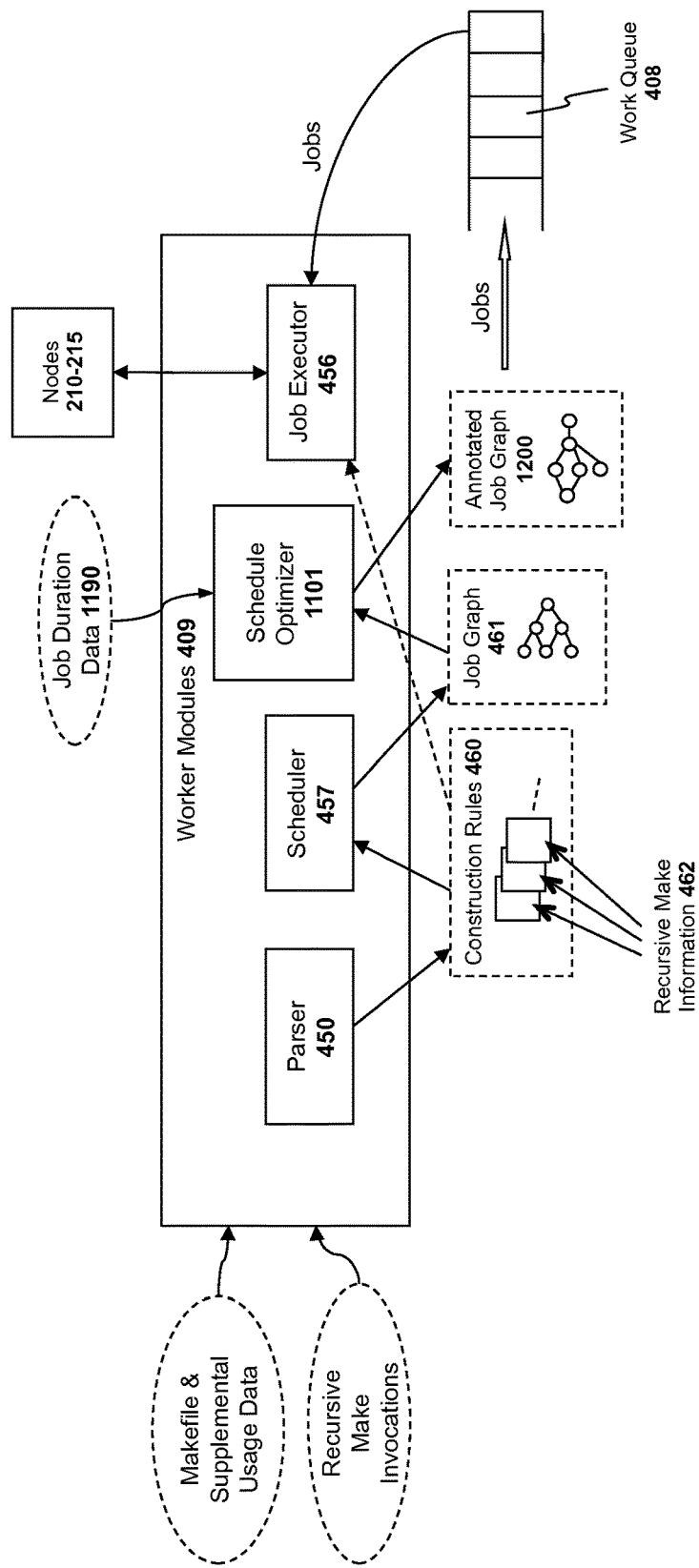
FIG. 12 illustrates additional details associated with one embodiment of a system for optimizing job scheduling within program builds.

FIG. 12 illustrates the schedule optimizer 1101 integrated within the context of a worker module 409 in accordance with one embodiment of the invention. In this embodiment, the schedule optimizer 1101 analyzes the job graph 461 generated by the scheduler module 457 to identify job chains and determine the optimal order in which to execute the job chains. The results of this analysis are then specified within an annotated job graph 1200 in which the nodes/jobs of the job graph are annotated with additional data (e.g., the chain length starting from that node as described herein). Using the additional data, jobs from the annotated job graph 1200 are then queued in the work queue 408 in a more efficient order from which they are dispatched for execution by the job executor module 465 (as discussed in detail above).

As mentioned above, in one embodiment, the schedule optimizer 1101 prefers the job having the longest chain starting at that job. As used herein, the "longest" chain starting at a given job is the one with the highest total run time including that starting job. In order for the schedule optimizer 1101 to perform job scheduling based on chain length, the schedule optimizer 1101 must first determine the chain lengths accurately and efficiently. In one embodiment, the input to the computation is the job graph 461 generated by the scheduler 457 which consists of nodes representing jobs and edges indicating a dependency between jobs. For example, if there exists and edge A→B in the graph, this means that job B depends upon job A (or put another way, that B is a "waiter" of A, or equivalently that A is a prerequisite of B). The graph is assumed to be both directed and acyclic (i.e., a directed, acyclic graph or DAG), and has two special nodes. The first is a source node, which has no inbound edges. The second is a sink node, which has no outbound edges. Each node is further annotated with the length of the job, which is the expected duration of that job based on historical average length for the job in other builds, as indicated by the job duration data 1190 provided to the schedule optimizer 1101 in FIGS. 11-12.

Figure 13:
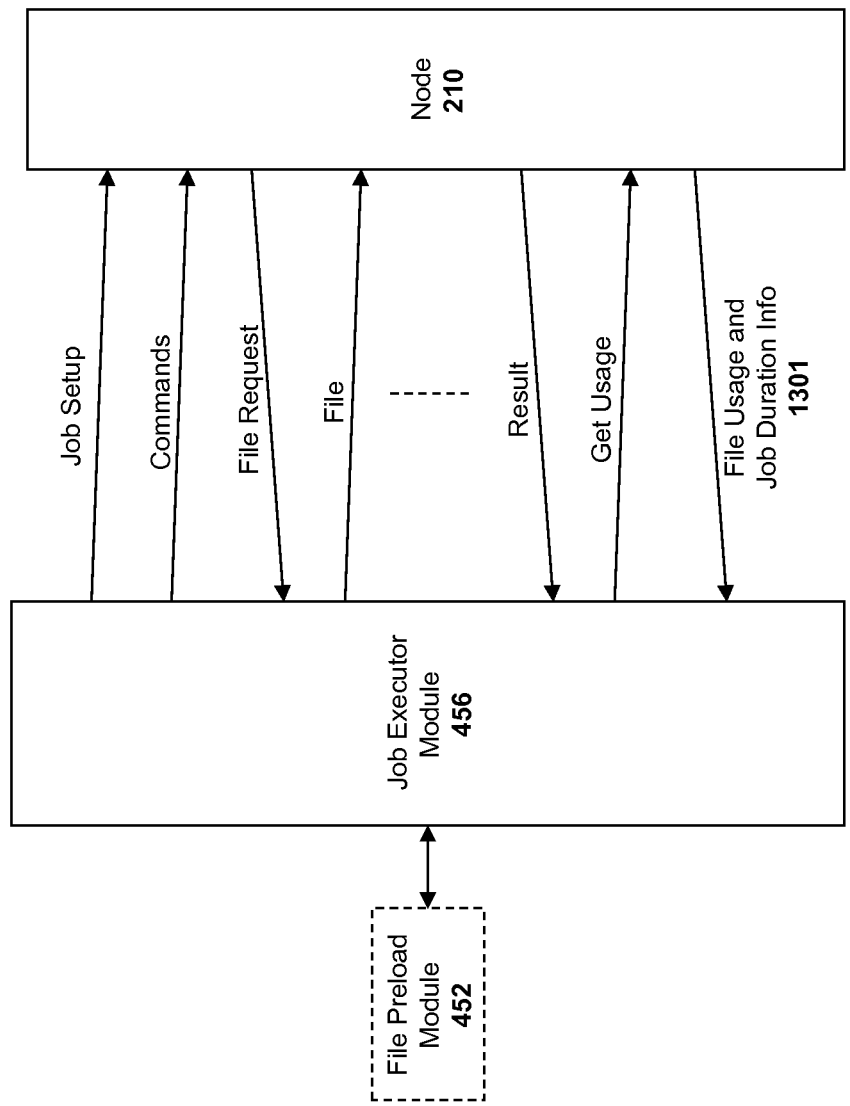
FIG. 13 illustrates a node providing file usage and job duration information to a job executor module.
Figure 14:
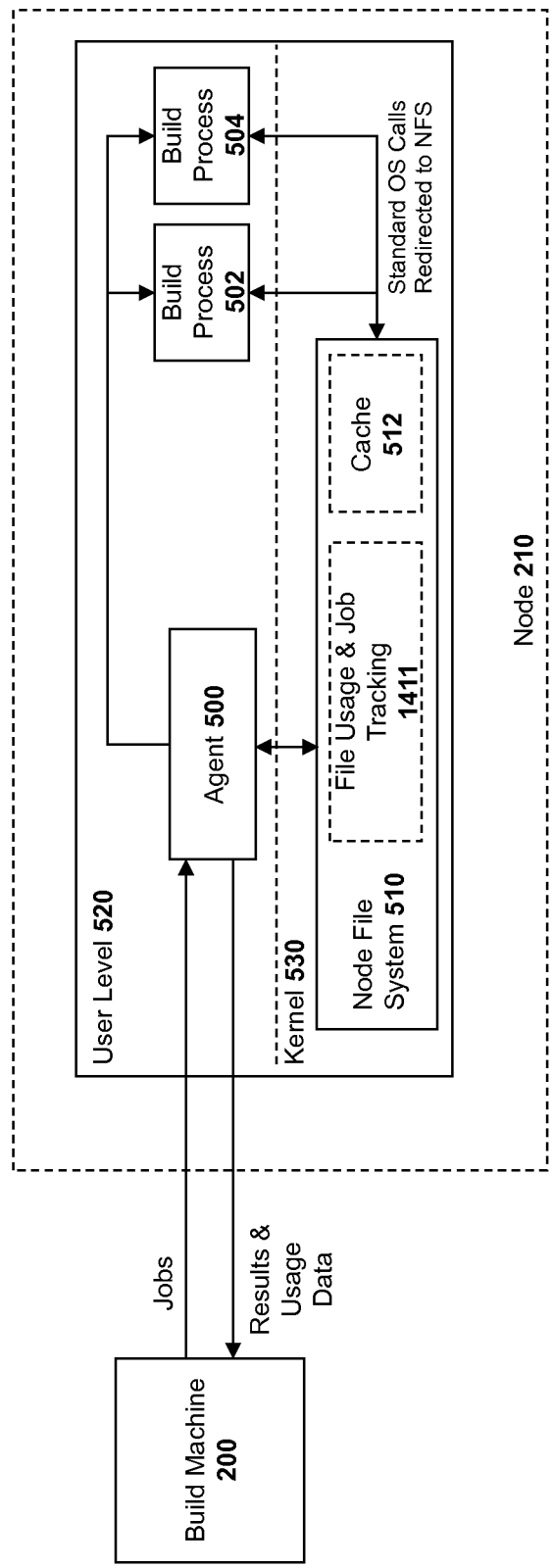
FIG. 14 illustrates one embodiment of a system in which job duration information and other information related to a program build is collected at a node.

In one embodiment, the duration of each job is collected by the file usage and job tracking module 1411 illustrated in FIG. 14 during the execution of each job (in addition to collecting the file usage data discussed above). The job duration data is then provided back to the build machine 200 upon job completion. For example, FIG. 13 illustrates how both the file usage information and job duration information 1301 may be provided from the node 210 which executed the job to the job executor module 456 on the build machine 200. In one embodiment, the job duration data is collected directly by the job executor module 456 itself (rather than being received from the node 210). The underlying principles of the invention are not limited to the use of any particular module for collecting the job duration data. In any implementation, once collected, the job duration information may then be accumulated for use in subsequent builds.

In addition to the job graph 461, one embodiment of the schedule optimizer 1101 takes as input a list of nodes in the graph produced by a standard topological sort of the graph. In one embodiment, the list of nodes is computed prior to the execution of the algorithm, although if necessary it could be recomputed as needed (which may save space, at the cost of additional processing time). By definition, the first node in the list is the source node, and the last is the sink node.

Figure 15:
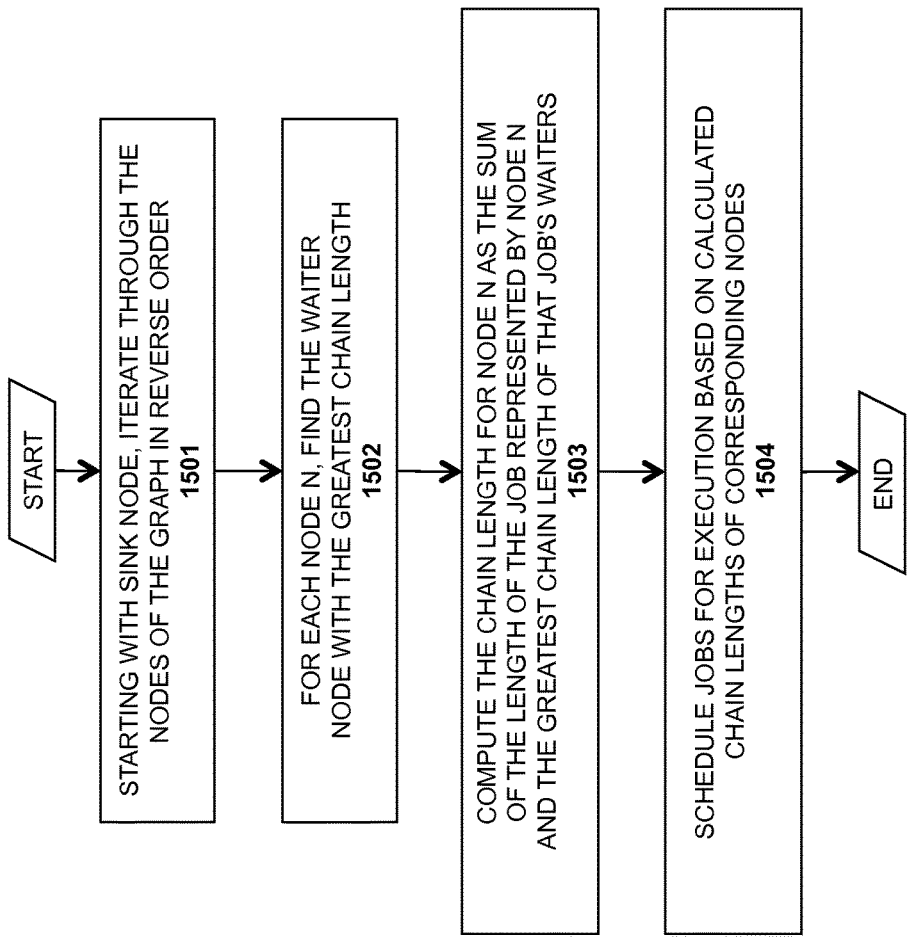
FIG. 15 illustrates one embodiment of a method for optimizing job scheduling within program builds.

With these inputs, one embodiment of the algorithm implemented by the schedule optimizer is as follows, as illustrated in FIG. 15:

Step 1501: Starting with the sink node, iterate through the nodes of the graph in reverse order.

Step 1502: For each node N, find the waiter node with the greatest chain length. If the node has no waiters then the greatest chain length is considered to be zero.

Step 1503: The chain length for node N is computed as the sum of the length of the job represented by node N and the greatest chain length of that job's waiters.

Step 1504: The schedule optimizer 1101 schedules jobs for execution in the work queue based on the calculated chain lengths associated with each of the jobs. For example, in one embodiment, the schedule optimizer will schedule jobs associated with relatively longer chains ahead of jobs with relatively shorter chains (all other variables being equal).

In one embodiment, the algorithm executes in an amount of time proportional to the sum of the number of nodes and number of edges in the graph. Build dependency graphs are typically not strongly connected, so in practice the number of edges in the graph is proportional to the number of nodes by a constant factor, meaning that the expected runtime is proportional to the number of nodes in the graph. The worst-case runtime is proportional to the square of the number of nodes.

In one embodiment, on startup, the schedule optimizer 1101 uses the dependencies and job duration data collected in previous builds to compute chain lengths using the algorithm illustrated in FIG. 15 and described above. Chain lengths are then used to determine scheduling order between jobs that are otherwise equivalent.

In one embodiment, when each build completes the dependency data and job duration data 1301 is stored to a file (or other data structure) to be used in subsequent builds. Existing information in the file may be combined with the information gathered in the current build run. For example, as mentioned above, a running average duration may be maintained in the file for each job. Alternatively, the raw duration of each job may be stored in the file and the average may be calculated at the start of each new build. The underlying principles of the invention remain the same regardless of how the duration data is stored and utilized.

Figure 16A:
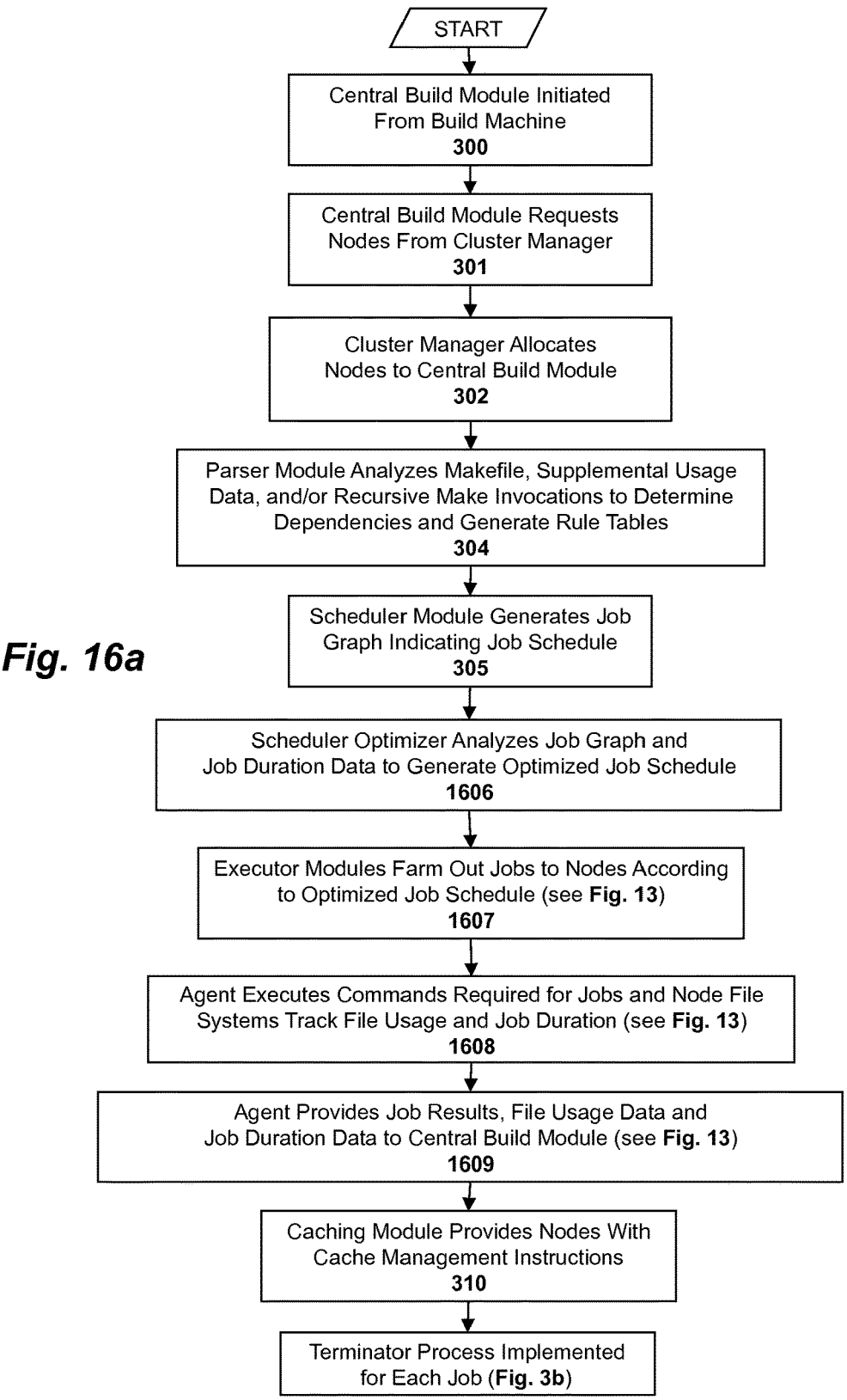
FIGS. 16a-b illustrate embodiments of a method for collecting and utilizing file dependency data and job duration data to optimize job scheduling.
Figure 16B:
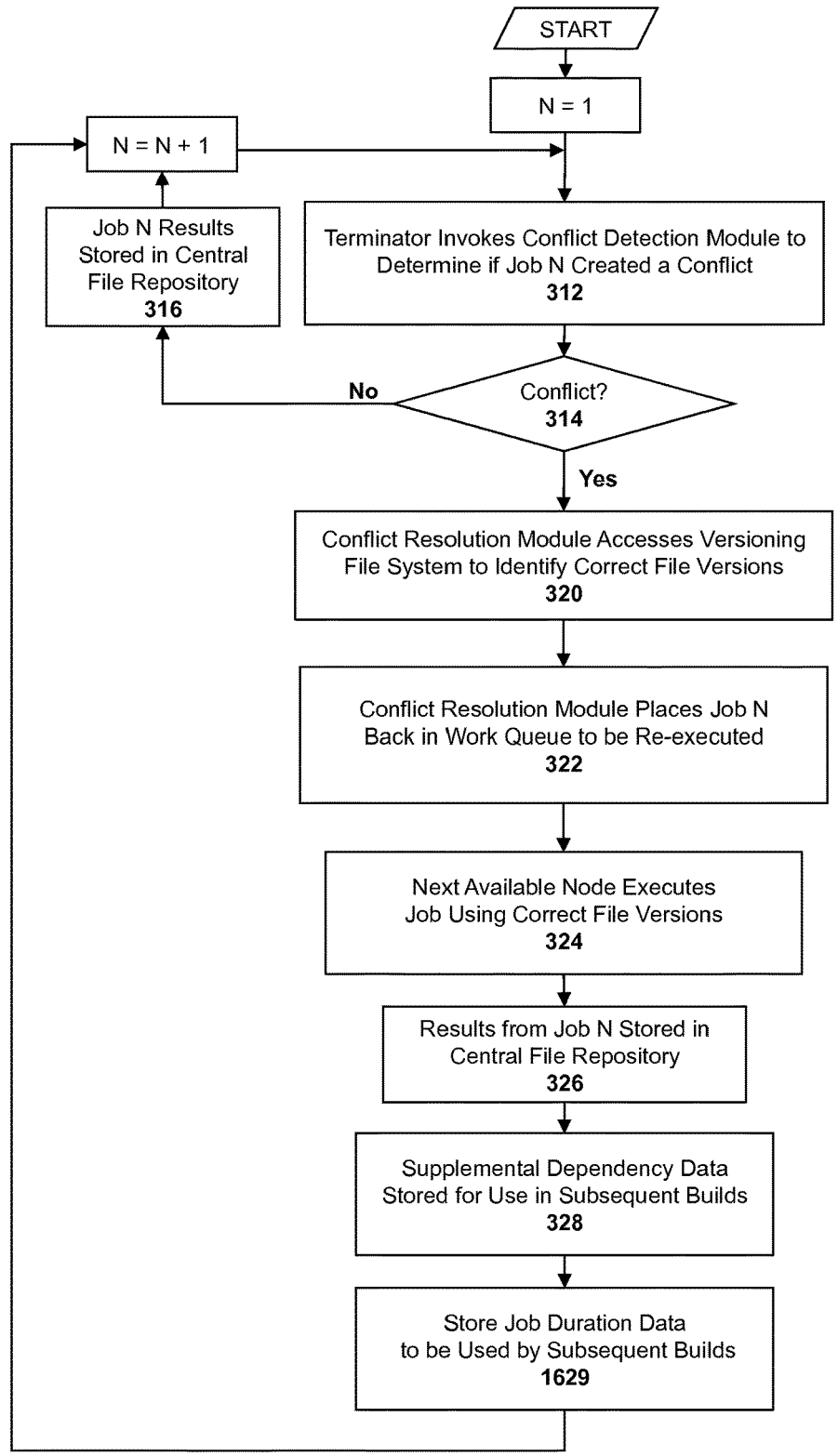

FIGS. 16*a-b* illustrate how one embodiment of the invention may be integrated within the methods illustrated in FIGS. 3*a-b*, respectively. As previously mentioned with respect to FIG. 3*a*, at 300, the central build module is executed from the build machine to initiate a parallel build. At 301, the central build module requests a set of nodes to execute jobs for the builds from the cluster manager. As previously described, the cluster manager 202 may be implemented as a Web server which tracks the current status and availability of all nodes in the system. At 302, the cluster manager allocates nodes to the central build module to participate in the current build. At 304, the parser 450 (see, e.g., FIG. 12) analyzes the Makefile, any supplemental file usage data (as described below) and/or any recursive Make instances 462 detected and processed by the system. The specific processing associated with supplemental usage data and recursive Make instances is described in detail above. Based on its analysis, the parser 450 generates a set of target construction rules 460 specifying how each individual component of the program build (e.g., each target file) is constructed. The construction rules 460 include all of the dependency information extracted from the Makefile, the supplemental usage data and the recursive Make invocations 462 as well as all of the associated ambient state information (e.g., the current working directory, any command line switches, . . . etc). In one embodiment, the construction rules 460 are stored continuously in main memory so as to be readily accessible by the scheduler 457 and job executor modules 456 during the course of the program build.

At 305, the scheduler 457 analyzes the construction rules 460 to generate a job graph 461 indicating the specific order in which jobs are to be executed in parallel on the nodes (see, e.g., the Makefile example provided above with respect to FIG. 3*a*).

At 1606, once the job graph is built, the scheduler optimizer analyzes the job graph generated by the scheduler 457 and the job duration data (previously provided from the nodes) to generate an optimized job schedule using the techniques described herein (see, e.g., FIG. 15). For example, in one embodiment, the scheduler optimizer arranges jobs based on the detected job chain length associated with each of the jobs (e.g., prioritizing longer chains as discussed above).

At 1607, the executor module 456 farms out jobs to nodes according to the optimized job schedule. For example, in one embodiment, the executor module read the jobs from the work queue 408 and coordinates with the nodes 210-215 to execute the jobs. Each executor module 456 may coordinate with a single node at a time to complete a single job (although the specific node used by the executor module 456 may change from job to job). However, the underlying principles of the invention are not limited to any particular pairing of executor modules, nodes and jobs.

At 1608, in response to build commands provided from the executor module 456, the agent executed on the node 210 invokes the processes required to complete the job. In the specific example shown in FIG. 14, an agent 500 invokes two build processes, process 502 and process 504, to complete the node's 210's assigned job. By way of example, the processes 502 and 504 might be ar and ranlib as described above. In one embodiment, both of the processes 502 and 504 and the agent 500 operate at the application or user level 520 whereas the node file system 510 functions within the node operating system kernel 530.

In addition, at 1608, the file usage and job tracking module 510 shown in FIG. 14 collects file usage data (e.g., as described in detail above with respect to FIG. 5) and information related to each executed job such as the length of time it takes each job to complete (sometimes referred to herein as "job duration data"). At 1609, it then reports this information back to the to the central build module 400 for analysis. As discussed in detail herein, in one embodiment, the schedule optimizer 1101 uses the job duration data to optimize the scheduling of jobs in subsequent program builds. The rest of the operations set forth in FIG. 16a operate in substantially the same manner as the corresponding operations set forth in FIG. 3a.

In FIG. 16b, the operations 312, 314, 316, 320, 322, 324, 326, and 328 operate in substantially the same manner as the corresponding operations in FIG. 3b. In addition to these operations, at 1629, the job duration data collected at each of the nodes is provided to the central build module and stored for use in subsequent builds.

In the foregoing description, for the purposes of explanation, numerous specific details are set forth in order to provide a thorough understanding of the present invention. It will be apparent, however, to one skilled in the art that the present invention may be practiced without some of these specific details. For example, while the embodiments described above focus specifically on "Makefiles" and the "Make" utility, the underlying principles of the invention may be employed within the context of virtually any program build environment. By way of example, and not limitation, the same principles may employed within the context of the "Vesta" system developed by the Systems Research Center of Digital Equipment Corporation (DEC) (Vesta uses a "model file" analogous to the Makefile) and/or Microsoft's Visual Studio.

In addition, while the architecture described above employs a series of individual "nodes" for performing program builds, many of the concepts set forth above may also be implemented within a single high powered computer system having multiple processors. In certain instances set forth above, well-known structures and devices are shown in block diagram form to avoid obscuring the underlying principles of the present invention.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

What is claimed is:

1. A method for executing program builds comprising:
analyzing file dependency information and job duration information associated with jobs of a past program build to determine a total duration for each of the jobs, wherein the total duration of a job is a sum of a duration of the job and the duration of one or more jobs that are dependent on the job;
scheduling jobs for a current program build based on analysis of both the file dependency information and the job duration information including analyzing the total duration for each of the jobs determined from the analysis of the file dependency information and the job duration information, wherein a first job that is otherwise equivalent to a second job is scheduled before the second job for the current program build based on relative total durations of the first job and the second job, wherein the scheduling further comprises:
building a job graph based on the file dependency information and/or file usage information, wherein the job graph comprises a plurality of nodes and edges, each node representing a job and each edge representing dependencies between the jobs of the current program build, the nodes including at least one source node having no inbound edges and at least one sink node having no outbound edges; and
analyzing the job graph in view of the job duration information to determine an optimized order in which to execute the jobs of the current program build, wherein analyzing the job graph in view of the job duration information to determine an optimized order in which to execute the jobs of the current program build further comprises:
iterating through the nodes of the job graph in reverse order, starting with the sink node;
for each node N, determining a waiter node with the greatest chain length, wherein a chain represents a sequence of jobs such that each job in the sequence directly waits for a previous job in the sequence before it will execute;
computing the chain length for node N as the sum of the length of the job represented by node N and the greatest chain length of that job's waiter nodes; and
scheduling jobs of the current program build for execution in the optimized order based on calculated chain lengths of corresponding nodes;
executing the jobs of the current program build according to the optimized order;
collecting file usage information and new job duration information from each of the executed jobs of the current program build;
supplementing the file dependency information with the collected file usage information; and
storing the new job duration information to be used for scheduling jobs in subsequent program builds.

2. The method as in claim 1 wherein the optimized order comprises an order in which larger chain lengths are executed ahead of shorter chains, all other variables being equal.

3. The method as in claim 1 wherein executing the jobs of the current program build according to the schedule comprises:
  scheduling the jobs of the current program build for parallel execution across a plurality of nodes.

4. The method as in claim 3 further comprising:
  collecting the file usage information and the new job duration information at each of the nodes; and
  transmitting the file usage information and the new job duration information from each of the nodes to a central build module, the central build module combining and storing the file usage information and the new job duration information received from each of the nodes.

5. The method as in claim 4 further comprising:
  transmitting files required for each of the jobs of the current program build to each of the respective nodes prior to the execution of each of the jobs of the current program build on the nodes.

6. The method as in claim 1 wherein the job duration information is accumulated across multiple program builds and used to schedule jobs for the current program build.

7. The method as in claim 6 wherein accumulating the job duration information comprises maintaining a running average for each job of the current program build.

8. A non-transitory machine-readable medium having program code stored thereon which, when executed by a machine, causes the machine to perform the operations of:
  analyzing file dependency information and job duration information associated with jobs of a past program build to determine a total duration for each of the jobs, wherein the total duration of a job is a sum of a duration of the job and the duration of one or more jobs that are dependent on the job;
  scheduling jobs for a current program build based on analysis of both the file dependency information and the job duration information including analyzing the total duration for each of the jobs determined from the analysis of the file dependency information and the job duration information, wherein a first job that is otherwise equivalent to a second job is scheduled before the second job for the current program build based on relative total durations of the first job and the second job, wherein the scheduling further comprises:
    building a job graph based on the file dependency information and/or file usage information, wherein the job graph comprises a plurality of nodes and edges, each node representing a job and each edge representing dependencies between the jobs of the current program build the nodes including at least one source node having no inbound edges and at least one sink node having no outbound edges; and
    analyzing the job graph in view of the job duration information to determine an optimized order in which to execute the jobs of the current program build, wherein analyzing the job graph in view of the job duration information to determine an optimized order in which to execute the jobs of the current program build further comprises:
      iterating through the nodes of the job graph in reverse order, starting with the sink node;
      for each node N, determining a waiter node with the greatest chain length, wherein a chain represents a sequence of jobs such that each job in the sequence directly waits for a previous job in the sequence before it will execute;
      computing, the chain length for node N as the sum of the length of the job represented by node N and the greatest chain length of that job's waiter nodes; and
      scheduling jobs of the current program build for execution in the optimized order based on calculated chain lengths of corresponding nodes;
  executing the jobs of the current program build according to the optimized order;
  collecting file usage information and new job duration information from each of the executed jobs of the current program build;
  supplementing the file dependency information with the collected file usage information; and
  storing the new job duration information to be used for scheduling jobs in subsequent program builds.

9. The non-transitory machine-readable medium as in claim 8 wherein the optimized order comprises an order in which larger chain lengths are executed ahead of shorter chains, all other variables being equal.

10. The non-transitory machine-readable medium as in claim 8 wherein executing the jobs of the current program build according to the schedule comprises:
  scheduling the jobs of the current program build for parallel execution across a plurality of nodes.

11. The non-transitory machine-readable medium as in claim 10 further comprising program code to cause the machine to perform the operations of:
  collecting the file usage information and the new job duration information at each of the nodes; and
  transmitting the file usage information and the new job duration information from each of the nodes to a central build module, the central build module combining and storing the file usage information and the new job duration information received from each of the nodes.

12. The non-transitory machine-readable medium as in claim 11 further comprising program code to cause the machine to perform the operations of:
  transmitting files required for each of the jobs of the current program build to each of the respective nodes prior to the execution of each of the jobs of the current program build on the nodes.

13. The non-transitory machine-readable medium as in claim 8 wherein the job duration information is accumulated across multiple program builds and used to schedule jobs for the current program build.

14. The non-transitory machine-readable medium as in claim 13 wherein accumulating the job duration information comprises maintaining a running average for each job of the current program build.

* * * * *